US012654934B2

(12) United States Patent (10) Patent No.: US 12,654,934 B2
Flood et al. (45) Date of Patent: *Jun. 16, 2026

(54) METHOD AND APPARATUS FOR MONITORING WASTE REMOVAL AND ADMINISTRATION

(71) Applicant: Advanced Custom Engineered Systems & Equipment Co., St. Charles, IL (US)

(72) Inventors: Christopher M. Flood, St. Charles, IL (US); Michael S. Fisher, Richardson, TX (US)

(73) Assignee: Advanced Custom Egineered Systems & Equipment Co., St. Charles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,741

(22) Filed: Sep. 26, 2023

(65) Prior Publication Data

US 2024/0158162 A1 May 16, 2024

Related U.S. Application Data

(63) Continuation of application No. 17/675,146, filed on Feb. 18, 2022, now Pat. No. 11,767,164, which is a continuation of application No. 17/204,547, filed on Mar. 17, 2021, now Pat. No. 11,267,646, which is a continuation of application No. 16/709,109, filed on
(Continued)

(51) Int. Cl.
| | |
|---|---|
| *B65F 1/14* | (2006.01) |
| *B65F 3/04* | (2006.01) |
| *G06K 19/077* | (2006.01) |
| *G06Q 10/30* | (2023.01) |
| *G06Q 50/26* | (2012.01) |
| *B65F 3/02* | (2006.01) |

(52) U.S. Cl.
CPC .......... *B65F 1/1484* (2013.01); *B65F 1/1473* (2013.01); *B65F 3/041* (2013.01); *G06K 19/07758* (2013.01); *G06Q 10/30* (2013.01); *G06Q 50/26* (2013.01); *B65F 2003/0279* (2013.01); *B65F 2210/128* (2013.01); *B65F 2210/164* (2013.01); *Y02W 90/00* (2015.05)

(58) Field of Classification Search
CPC ...... B65F 1/1484; B65F 1/1473; B65F 3/041; B65F 2003/0279; B65F 2210/128; B65F 2210/164; G06K 19/07758; G06Q 10/30; G06Q 50/26; Y02W 90/00
See application file for complete search history.

(56) References Cited

U.S. PATENT DOCUMENTS

| | | | | | |
|---|---|---|---|---|---|
| 5,014,206 | A | * | 5/1991 | Scribner | ................ G07C 5/008 |
| | | | | | 340/8.1 |
| 6,191,691 | B1 | * | 2/2001 | Serrault | ................ B65F 1/1484 |
| | | | | | 340/693.5 |

(Continued)

*Primary Examiner* — Tuyen K Vo
(74) *Attorney, Agent, or Firm* — McDonnell Boehnen Hulbert & Berghoff LLP

(57) ABSTRACT

A method for a municipality to control, track, and monitor waste or refuse receptacles requires a permit for use of a waste receptacle. An issuing organization issues a permit associated with a discreet receptacle identifier. An RFID tag is provided with the permit and attached to a discreet receptacle. The RFID tag transmits a signal carrying data associated with the discreet receptacle identifier. The signal may be read by a portable reader carried by municipal personnel to record violations of municipal code associated with the use of the discreet receptacle.

3 Claims, 18 Drawing Sheets

Related U.S. Application Data

Dec. 10, 2019, now Pat. No. 11,286,108, which is a continuation of application No. 15/406,970, filed on Jan. 16, 2017, now Pat. No. 10,501,264, which is a continuation of application No. 14/269,771, filed on May 5, 2014, now Pat. No. 9,546,040, which is a continuation of application No. 13/353,900, filed on Jan. 19, 2012, now Pat. No. 8,714,440, which is a continuation of application No. 12/274,273, filed on Nov. 19, 2008, now Pat. No. 8,146,798, which is a continuation-in-part of application No. 12/267,340, filed on Nov. 7, 2008, now Pat. No. 8,185,277, and a continuation-in-part of application No. 12/267,367, filed on Nov. 7, 2008, now abandoned.

(56)  References Cited

U.S. PATENT DOCUMENTS

| | | | |
|---|---|---|---|
| 2007/0025600 A1* | 2/2007 | Ghebreyesus | G06V 40/12 |
| | | | 340/5.83 |
| 2007/0262878 A1* | 11/2007 | Maruca | G06Q 10/087 |
| | | | 340/686.1 |
| 2008/0010197 A1* | 1/2008 | Scherer | G06Q 20/102 |
| | | | 705/40 |
| 2008/0077541 A1* | 3/2008 | Scherer | G06Q 30/04 |
| | | | 705/400 |
| 2009/0276299 A1* | 11/2009 | Gonen | G06Q 20/14 |
| | | | 705/14.1 |

* cited by examiner

200b

206

204

208b

202

208a

100

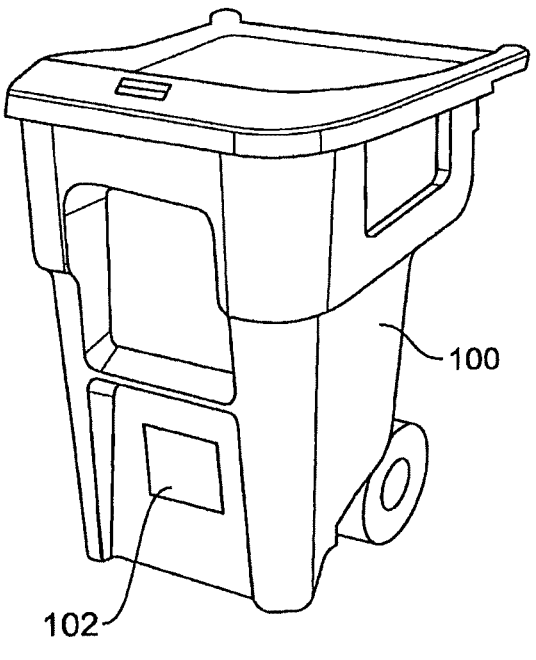
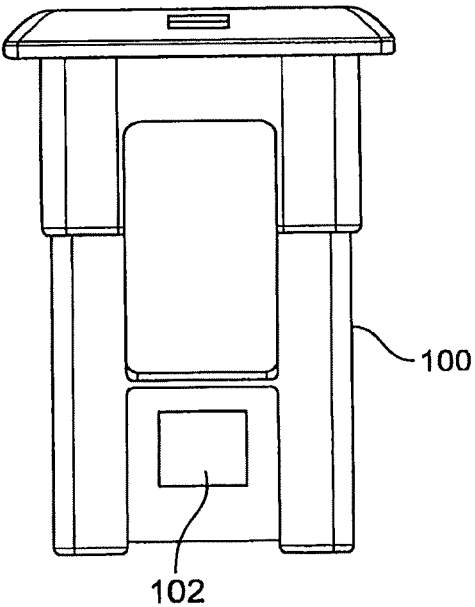
FIG. 9

FIG. 17

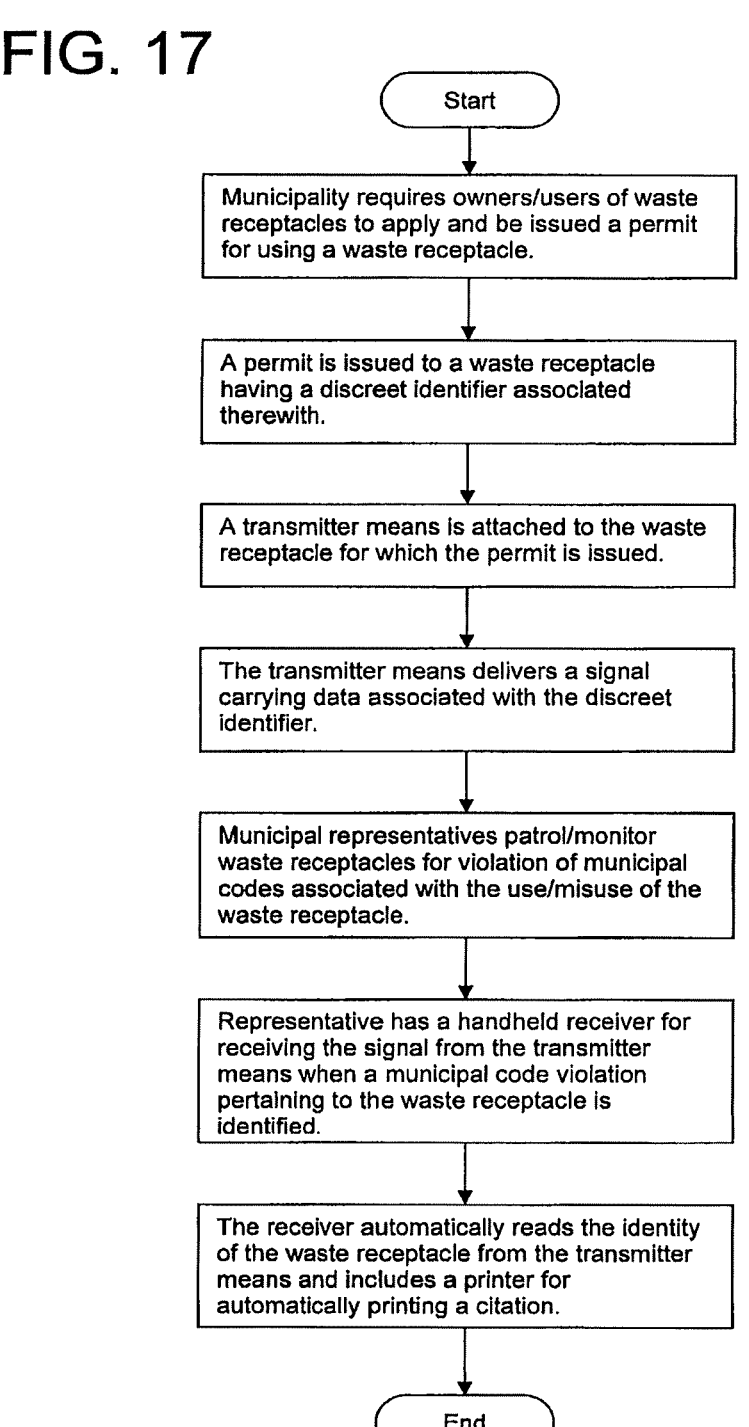

Start

Municipality requires owners/users of waste receptacles to apply and be issued a permit for using a waste receptacle.

A permit is issued to a waste receptacle having a discreet identifier associated therewith.

A transmitter means is attached to the waste receptacle for which the permit is issued.

The transmitter means delivers a signal carrying data associated with the discreet identifier.

Municipal representatives patrol/monitor waste receptacles for violation of municipal codes associated with the use/misuse of the waste receptacle.

Representative has a handheld receiver for receiving the signal from the transmitter means when a municipal code violation pertaining to the waste receptacle is identified.

The receiver automatically reads the identity of the waste receptacle from the transmitter means and includes a printer for automatically printing a citation.

End

METHOD AND APPARATUS FOR MONITORING WASTE REMOVAL AND ADMINISTRATION

This application is a continuation application of application Ser. No. 15/406,970 filed on Jan. 16, 2017, which is a continuation of application Ser. No. 14,269,771, now U.S. Pat. No. 9,546,040, filed on May 5, 2014, which is a continuation of Ser. No. 13/353,900, now U.S. Pat. No. 8,714,440, filed on Jan. 19, 2012, which was a continuation of application Ser. No. 12/274,273, now U.S. Pat. No. 8,146,798, filed on Nov. 19, 2008, which was a continuation-in-part of application Ser. No. 12/267,367, filed on Nov. 7, 2008 and application Ser. No. 12/267,340, now U.S. Pat. No. 8,815,277, also filed on Nov. 7, 2008. Each application is hereby incorporated by reference as if fully set forth herein.

FEDERALLY SPONSORED RESEARCH OR DEVELOPMENT

N/A

TECHNICAL FIELD

The invention relates to refuse and waste removing and hauling. More particularly, the present invention relates to a method and apparatus for controlling, tracking, and monitoring movement of waste or refuse receptacles.

BACKGROUND OF THE INVENTION

The collection and transportation of trash and recyclables from residential, commercial, industrial and large residential facilities is a major industry in the United States and throughout the civilized world. Typically, trash and recyclables are accumulated and temporarily stored in waste material receptacles such as trash cans and dumpsters. When filled, or at regularly scheduled intervals, trash and recyclables from the containers are transported for the eventual recycling, incineration and/or disposal into landfills.

Customers typically pay for trash and recyclables removal services based on the amount of trash and recyclables removed and the number of trash and recyclables pickups over a period of time. The compacting of trash and recyclables at a customer's location typically reduces the number of pickups. A successful trash and recyclables compactor is disclosed in U.S. Pat. No. 6,412,406, titled Trash Compactor and owned by Advanced Custom Engineered Systems & Equipment, Inc., Carol Stream, Illinois.

These industrial, commercial and large residential bins and compactors are collected from different locations and hauled to a central location. Normally, those hauling the trash and recyclables are sent from a central location and dispatched to the different locations. In practice, paper logs or schedules document the hauler's runs (e.g., trash and recyclables to pick-up, trash and recyclables being picked-up, and trash and recyclables picked-up). The haulers are given their routes in person or over the phone. The haulers, in turn, keep in touch with the central location generally by cell phone or radio.

For large organizations this can be a very complicated task as there are many haulers and many customers needing their trash and recyclables collected, picked-up and hauled away. In addition, commercial, industrial and large residential (e.g., condos and apartment buildings) trash and recyclables compactors and balers must be monitored for maintenance and repair. This too requires time and energy for the haulers and/or representatives (of the service provider) to monitor and inspect.

It should also be recognized that these industrial, commercial and large residential bins, balers and compactors require both period maintenance and emergency demand repair services. Normally, those repairing the equipment are sent from a central location and dispatched to the different locations. In practice, paper logs or work orders document the repairperson's time (e.g., drive time, time spent performing the repairs, parts and materials used, etc.). The repair companies use a variety of management tools. For example, some are given their routes in person or over the phone. The service providers, in turn, keep in touch with the central location generally by cell phone or radio.

For large organizations this can be a very complicated to coordinate and to verify that the charges for these services are fair and accurate as there are many service providers and many customers needing their compactors, bins and balers repaired. In addition, commercial, industrial and large residential (e.g., condos and apartment buildings).

In addition, it must be recognized that trash and recyclables compactors, balers and bins must further be monitored for maintenance and repair.

Methods of improving the refuse collection are disclosed in commonly assigned and co-pending U.S. Patent Application Publication No. 2008-0197194 A1, published on Aug. 21, 2008; U.S. Patent Application Publication No. 2008-0198021 A1, published on Aug. 21, 2008; and U.S. Patent Application Publication No. 2008-0202357 A1, published on Aug. 28, 2008. These publications are hereby incorporated by reference as if fully set forth herein, and generally disclose systems for communicating with receptacles, etc.

One opportunity that exists with refuse removal is to improve communication between the vehicles making refuse pick-ups (emptying receptacles) and the central station or dispatcher. Currently, the dispatcher may be in contact with the vehicle via radio or telephone transmission. However, it is not cost-effective of feasible for the dispatcher to be in constant contact with every vehicle out in the field. Thus, it is impossible for the dispatcher to relay account information associated with each receptacle to a vehicle. In would be advantageous to provide such information to the vehicle to prevent pick-up and emptying of receptacles owned or managed by entities delinquent in their payment of invoices. Also, a given account may have special instructions, such as an additional oversized pick-up, for a discreet single day or event. The dispatcher currently has no way of assuring that the special instructions are provided to the vehicle in a timely manner.

Furthermore, there is on-going and growing concern in major municipalities with controlling several aspects refuse collection. For instance, citizens or users will often engage in activity with respect to refuse receptacles that violates municipal codes. Some of this is caused by simply over-loading receptacles. Other times, a user may fall behind in payment of bills for removing refuse and waste, and the receptacles and surrounding areas will become over loaded with refuse. This provides a haven for vermin such as rats. It may also cause damage to the lane on which the receptacles are located.

Absent constant patrol of back lanes, municipalities often have no idea that these conditions exist until it is too late. Even when patrolling the back lanes, it is difficult to impossible to determine which receptacles belong to which owners/addresses. Finally, when a positive identification of the offending receptacle is able to be determined the process consumes so much time that the municipal employee is only able to investigate but a handful of the many violations that occur at any one time. Thus, city officials need a method that will facilitate receptacle identification while at the same time providing a simplified method of issuing citations to the proper entity responsible for the code violation.

The present invention is provided to solve the problems discussed above and other problems, and to provide advantages and aspects not provided by prior waste and refuse collection systems and apparatuses of this type. A full discussion of the features and advantages of the present invention is deferred to the following detailed description, which proceeds with reference to the accompanying drawings.

SUMMARY OF THE INVENTION

One aspect of the present invention is directed to a method for controlling a municipal permit system. The method comprises the steps of: (1) providing an RFID tag having a unique identifier; (2) issuing a permit for a subject of the permit; (3) and associating the unique identifier with the permit.

This aspect of the present invention may further comprise one or more of the following steps: (1) establishing a database having information associated with a permit holder and the unique identifier; (2) providing instructions for affixing the RFID tag onto the subject of the permit; (3) providing a portable reader for receiving a signal carrying the unique identifier from the RFID tag; (4) using the portable reader to receive the signal carrying the unique identifier from the RFID tag; (5) storing the unique identifier in a memory module; (6) issuing a citation for a violation of a municipal ordinance associated with a subject of the permit; and (7) providing a printer with the portable reader for printing the citation.

Another aspect of the present invention is directed to a permitting method for use by a municipality. This method comprises the step of issuing a permit to a permit holder. The permit comprises a unique identifier stored on a means for transmitting the unique identifier via a wireless signal.

This aspect of the invention may further one or more of the following steps: (1) providing instructions for affixing the means for transmitting on a subject of the permit; (2) providing a database on which identifying information for the permit holder is associated with the unique identifier; (3) providing a portable reader for receiving the wireless signal carrying the unique identifier from the means for transmitting; (4) transmitting a signal carrying the unique identifier from the portable reader to a central station at a separate location from the portable reader; (5) providing a computer at the central station; (6) inputting the unique identifier transmitted from the portable reader into the computer; (7) using a software on the computer to associate the unique identifier transmitted from the portable reader with the identifying information of the permit holder; and (8) transmitting at least some of the identifying information of the permit holder associated with the unique identifier transmitted from the portable reader from the central station to the portable reader.

Another aspect of the present invention is directed to a method for a municipality to control, track, and monitor waste or refuse receptacles. This method comprises the steps of: (1) requiring a permit for use of a waste receptacle; (2) issuing the permit associated with a discreet receptacle identifier; (3) providing a transmitter means attached to a discreet receptacle; and (4) transmitting a signal carrying data associated with the discreet receptacle identifier from the transmitter means. This aspect of the invention may further include the steps of: (1) providing a handheld receiver for receiving the signal from the transmitter means; (2) identifying a municipal code violation associated with a use of the waste receptacle; and/or (3) using the handheld receiver to automatically generate citations based on the municipal code violation.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 9 is a front and rear perspective views of a receptacle showing placement of a communication means;

FIG. 17 is a flowchart illustrating a method by which a municipality may use principles and concepts of the present invention to control, track, and monitor waste or refuse receptacles

DETAILED DESCRIPTION

Figure 1:
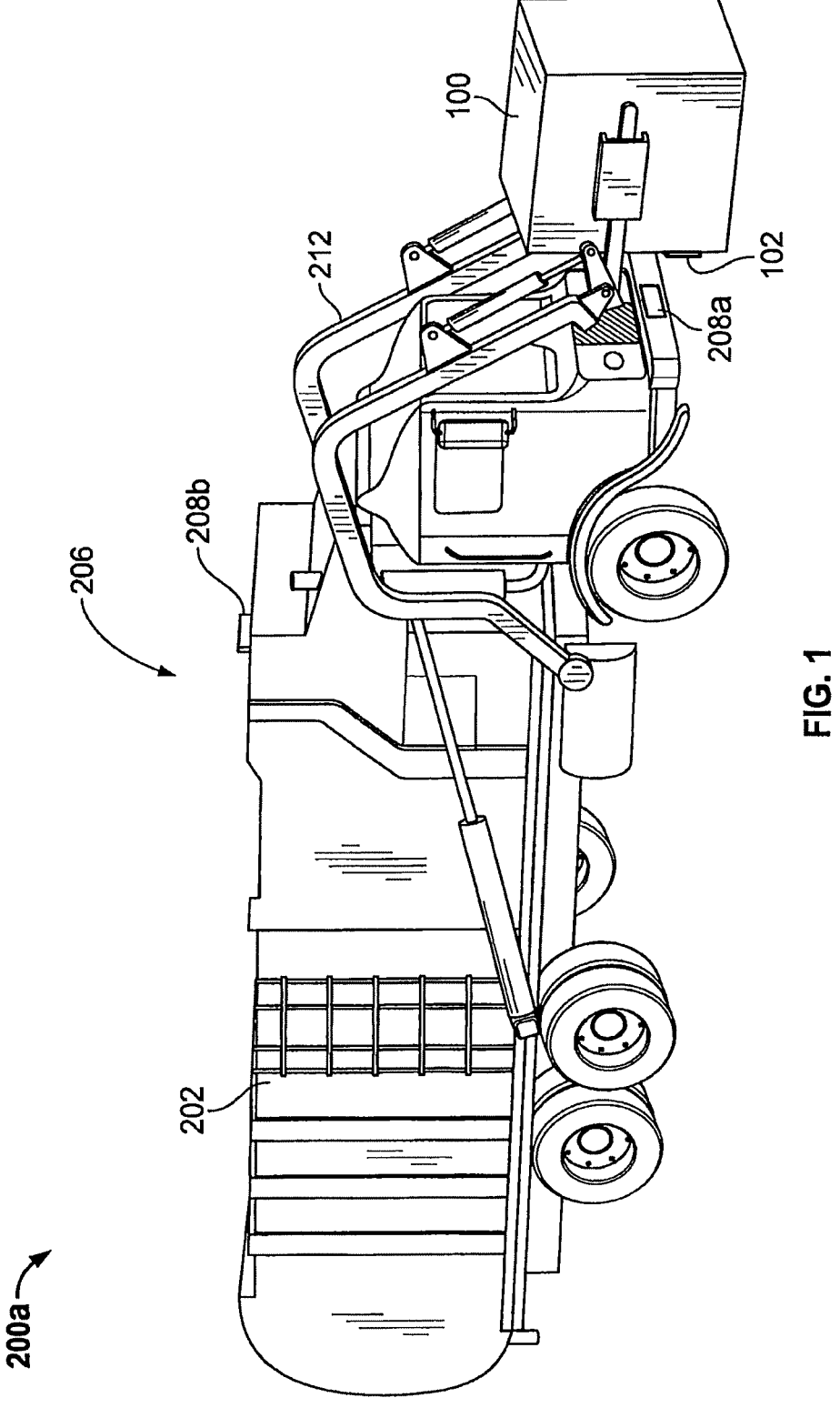
FIG. 1 is a perspective view of a waste removal and hauling vehicle of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIGS. 1-16, the present invention is directed to waste removal and hauling vehicles and systems or methods incorporating such vehicles with sensors and an operational network to facilitate proper, efficient and effective waste monitoring and collection. The inventors contemplate that the present invention will provide a means for municipalities to more effectively police violation of municipal codes in connection with commercial and residential waste collection and removal. The inventors further contemplate that the present invention will provide more effective communication between waste hauling vehicles and a dispatcher located at an external site. As best illustrated by the block diagram in FIG. 16, the overall system of the invention 10 comprises a receptacle 100, preferably a plurality of receptacles located at a plurality of locations throughout a municipality, a refuse or waste hauling vehicle 200, an external site 300, typically a central station, management office, dispatcher or the like, and a handheld reader/printer transmitter means 400 used in an example of a municipal functionality.

Each receptacle 100 is outfitted with a means of communicating or transmitting a signal carrying an identifier associated with the receptacle 102, such as a radio frequency identification (RFID) tag. RFID tags are well-known in the retail industry for identifying products. In particular, an RFID tag or transponder is an object applied to or incorporated into a product for the purpose of identification using radio waves. Most RFID tags contain at least two parts, namely an integrated circuit for storing and processing information, modulating and demodulating a (RF) signal and an antenna for receiving and transmitting the signal. RFID tags come in three general varieties: passive, active, or semi-passive (also known as battery-assisted). Passive tags require no internal power source, thus being pure passive devices (they are only activated when a reader is nearby to power them), whereas semi-passive and active tags require a power source, usually a small battery. While the present discussion focuses on passive RFID tags, it is recognized that a similar system can be used for active and semi-active RFID tags.

The RFID tags may transmit high frequency (HF) signals, low frequency signals (LF), or ultra high frequency (UHF) signals. The characteristics of these signals differ, and one particular frequency may be more advantageous than another based on the particular application of the system. For instance, low frequency signals have a short read range (distance) which would prevent errors or false reads. UHF signals can have a read range that is very short to very wide (any yards or meter).

While RFID, and in particular passive RFID tags are discussed herein, it is recognized that other identifying or alerting tags can be used. Many are known and perhaps others in the future. For example, electrical article surveillance (EAS) tags can be used. EAS tags are commonly used to prevent shoplifting from retail stores. The EAS tags are attached to merchandise and are removed or deactivated by the clerks when the item is properly bought or checked out. At the exits of stores, a detection system sounds an alarm or otherwise alerts the staff when it senses active tags. These tags are typically made of a strip of amorphous metal (metglas) having a low magnetic saturation value. This strip is also lined with a strip of ferromagnetic material with a coercive field (magnetic "hardness"). Detection is achieved by sensing harmonics and sum or difference signals generated by the non-linear magnetic response of the material under a mixture of low-frequency (in the 10 Hz to 1000 Hz range) magnetic fields.

When the ferromagnetic material is magnetized, it biases the amorphous metal strip into saturation, where it no longer produces harmonics. The tags are activated by demagnetization and deactivated with magnetization.

The identifier associated with the receptacle is preferably a discreet identifier which is assigned to the receptacle 100. The identifier information is stored on a database typically located at the external site 300, and electronically joined with an account to which the receptacle 100 belongs. In other words, account information is housed on a database located at the external site 300. Each account has one or more receptacle identifiers associated with it, and the database carries with it information typical to the management of any business account, for example, special instructions, accounts receivable, last receipt, last invoice, amount in arrears, days since last payment, historical account information, contact information, owner, etc.

Referring to FIG. 1-8, various vehicles 200a-d used in conjunction with the system 10 of the invention are illustrated. These vehicles 200a-d are intended to be examples of the types of waste removing and hauling vehicles used to transport refuse today, and the broad aspects of the invention should not be limited to the specific examples unless otherwise claimed. It should also be understood that the vehicles 200a-d and related concepts of the external site 300 and the receptacle 100 can be used alone or, more importantly, in combination with the municipal permitting concepts described above Each of the vehicles 200a-d includes a waste bin 202 located above a baseline upon which the vehicle 200a-d is supported, generally the ground. The waste bin 202 includes a chamber 204 and an emptying site 206. The refuse within the receptacles 100 is loaded into the chamber 204 via the emptying site 206. One of ordinary skill in the art of waste hauling would readily understand this method of refuse handling without further description as it is the standard procedure employed in the art.

Figure 13:
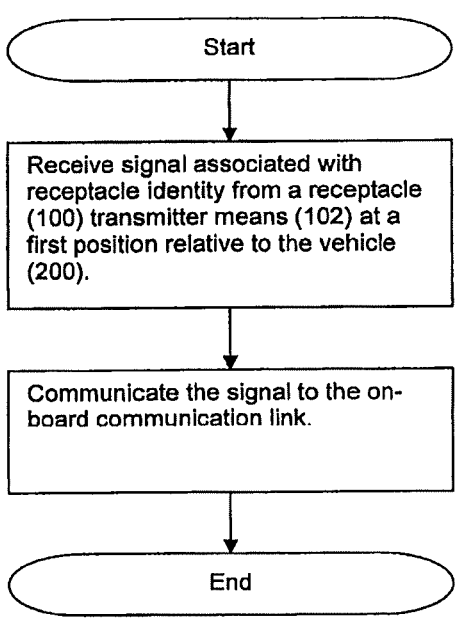
FIG. 13 is a flowchart of a process of a first receiver located at a first position on a waste removal and hauling vehicle.
Figure 14:
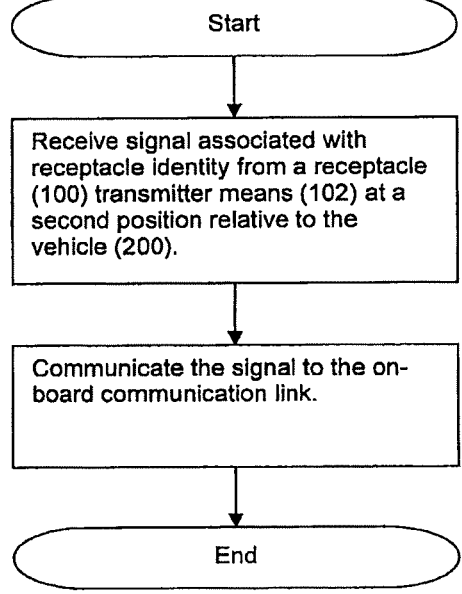
FIG. 14 is a flowchart of a process of a second receiver located at a second position on a waste removal and hauling vehicle.

The vehicles 200a-d are further outfitted with at least one receiver 208a, in most cases a plurality of receivers 208a,b and preferably two. The receivers 208a,b may be sensors, transducers, or antennae, or any combination thereof. As illustrated in FIGS. 13 and 14, preferably, the receivers 208 receive the signal from the transmitting means 102 on the receptacles 100 and send a corresponding signal via wire, wireless, or any other medium to an on-board communication or data link 210. The signal from the receiver 208a,b may be response signal to the energy in the form of the signal transmitted by the transmitter means 102, or the signal may simply be a pass through signal, including conversion from a wireless signal to a signal carried by another medium such as a wire. In either case, all or a part of the signal from the receivers 208 to the data link are associated with the actual identity or the discreet identifier associated with the each receptacle 100. In the case where a separate response signal to the transmitter means 102 is generated, the response signal may carry additional information such as location of the particular receiver 208a,b generating the signal, etc.

The locations chosen for the receivers 208a,b are extremely important because the receivers 208a,b are used for several different purposes, including for possible tracking of the receptacle 100 as it is transferred from position-to-position relative to the vehicle 200a-d by a means for transferring the receptacle 212, which may be automated systems known in the art, as shown in FIGS. 1-8, comprising mechanical arms, booms, or the like extending outwardly from the vehicle 200 to which a waste receptacle 100, or a waste bin 202 in the case of a roll-off vehicle 200*d* r or manual systems also known in the art. For instance, in a conventional refuse collection and hauling vehicles 200*a-d* illustrated in FIGS. 1-8, a first receiver 208*a* is located at a position where reception of the signal from the transmitter means 102 can be promoted prior to unloading or emptying of the receptacle. As shown in the FIGS. 1-8, the first location or position is typically where the receptacle 100 is engaged by the means for transferring the receptacle 212 prior to the receptacle 100 being transported to the emptying site 206 by the means for transferring 212.

Figure 2:
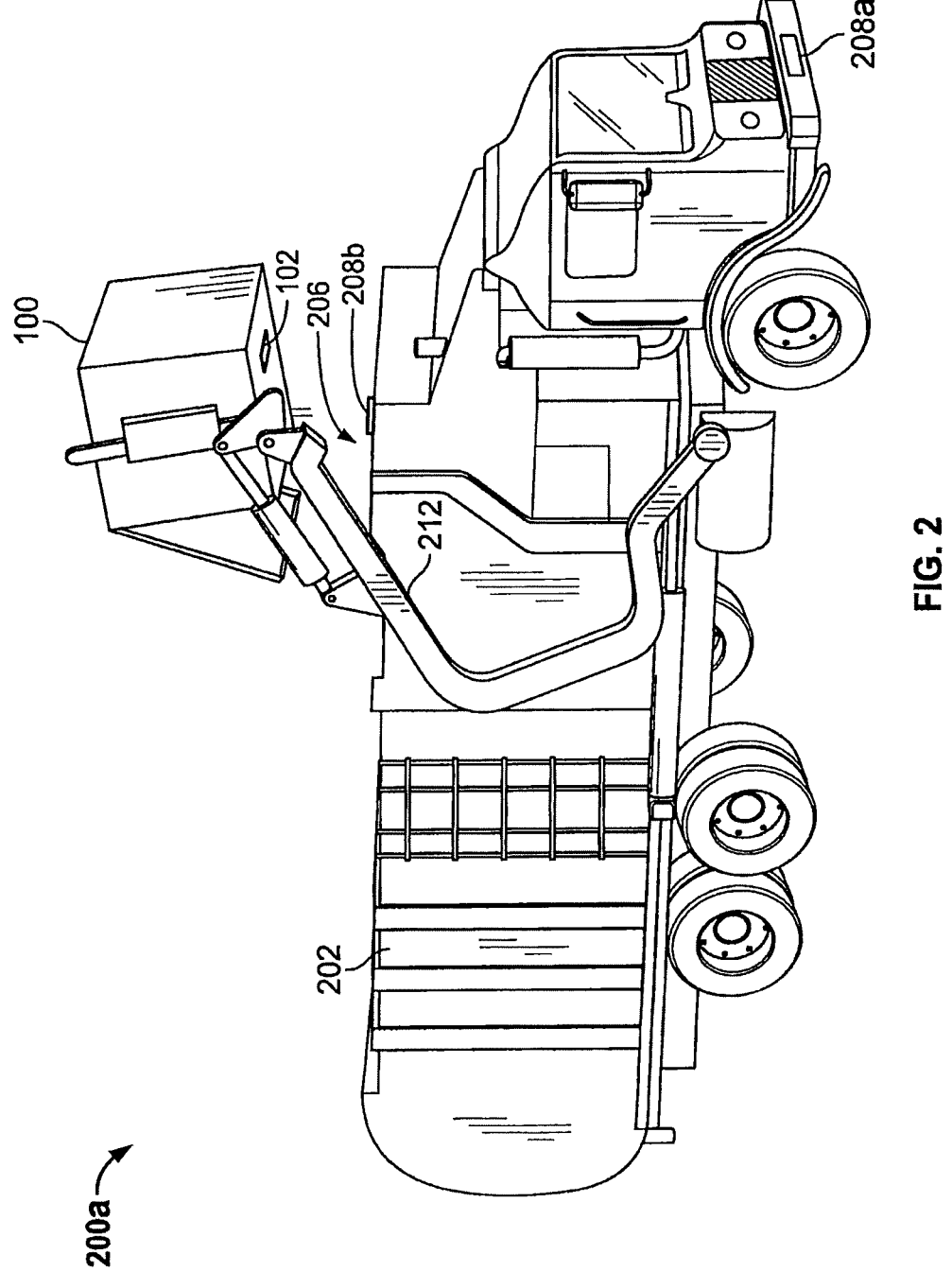
FIG. 2 is a perspective view of the vehicle of FIG. 1 with a waste receptacle in an unloading position.

The preferred location of the first receiver 208*a* on a front loading vehicle 200*a*, illustrated in FIGS. 1 and 2, is on the front of the vehicle 200*a* below the windshield and centered between opposing ends or sides. The first receiver 208 may be recessed or spaced from the bumper such that accidental collision with an obstacle would not damage the receiver. Accordingly, the first receiver 208*a* may be located within or protected by the shell of the vehicle 200*a* as long as the receiver 208*a* is capable of achieving its purpose. One example of such a location may be behind the vehicle radiator grill. In any event, the first receiver 208*a* is associated with the means for transferring the receptacle 212 when the receptacle is in a first position. As illustrated, the means for transferring 212 comprises a pair of arms with grasping hooks for engaging corresponding handles on the receptacle 100.

FIGS. 3-6 show vehicles emptying a certain type of receptacle 100. This type of receptacle 100 is illustrated in FIG. 9 to show a placement position for the communication means 102 which may not be evident from FIGS. 3-6.

Figure 3:
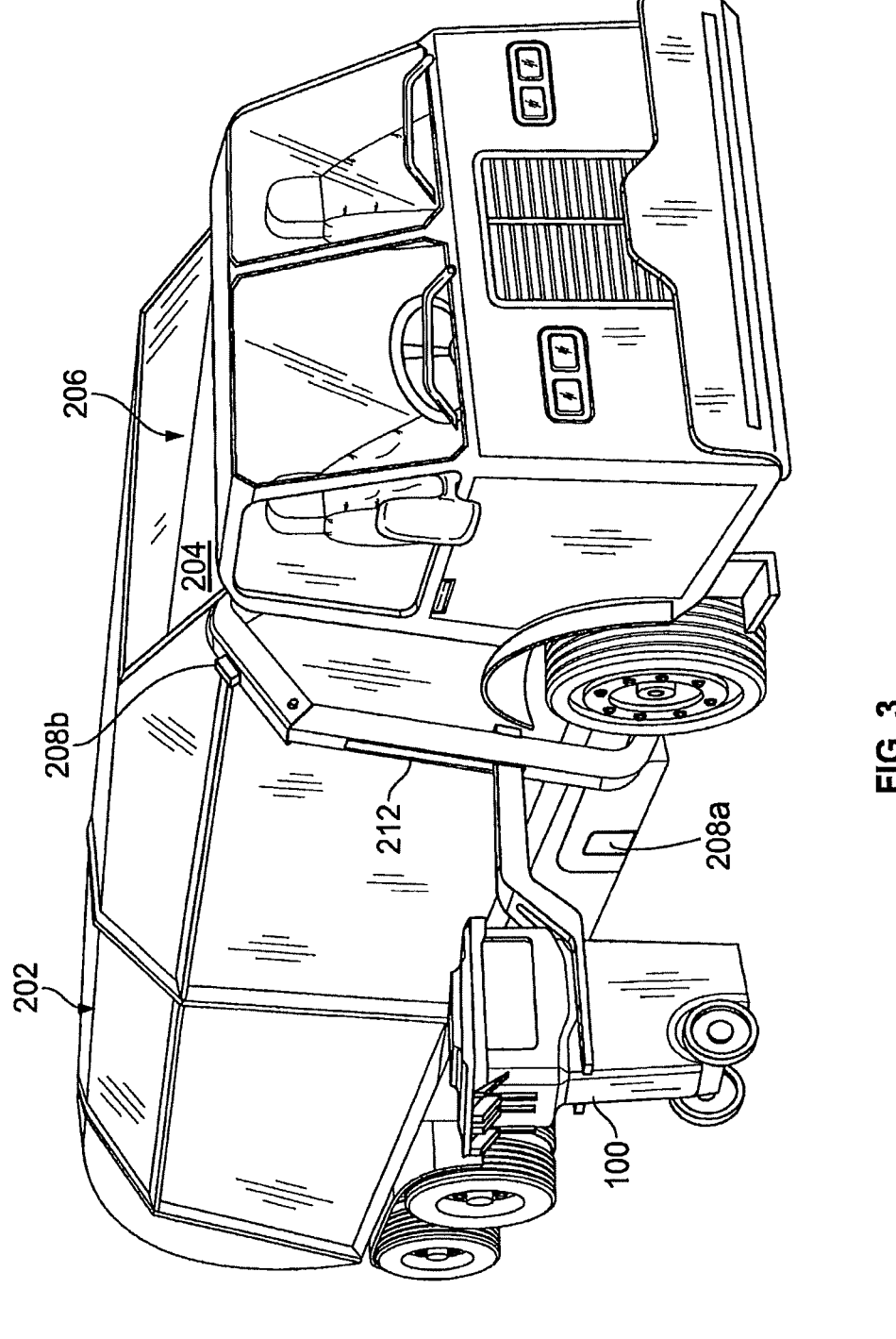
FIG. 3 is a perspective view of a second waste removal and hauling vehicle of the present invention.
Figure 4:
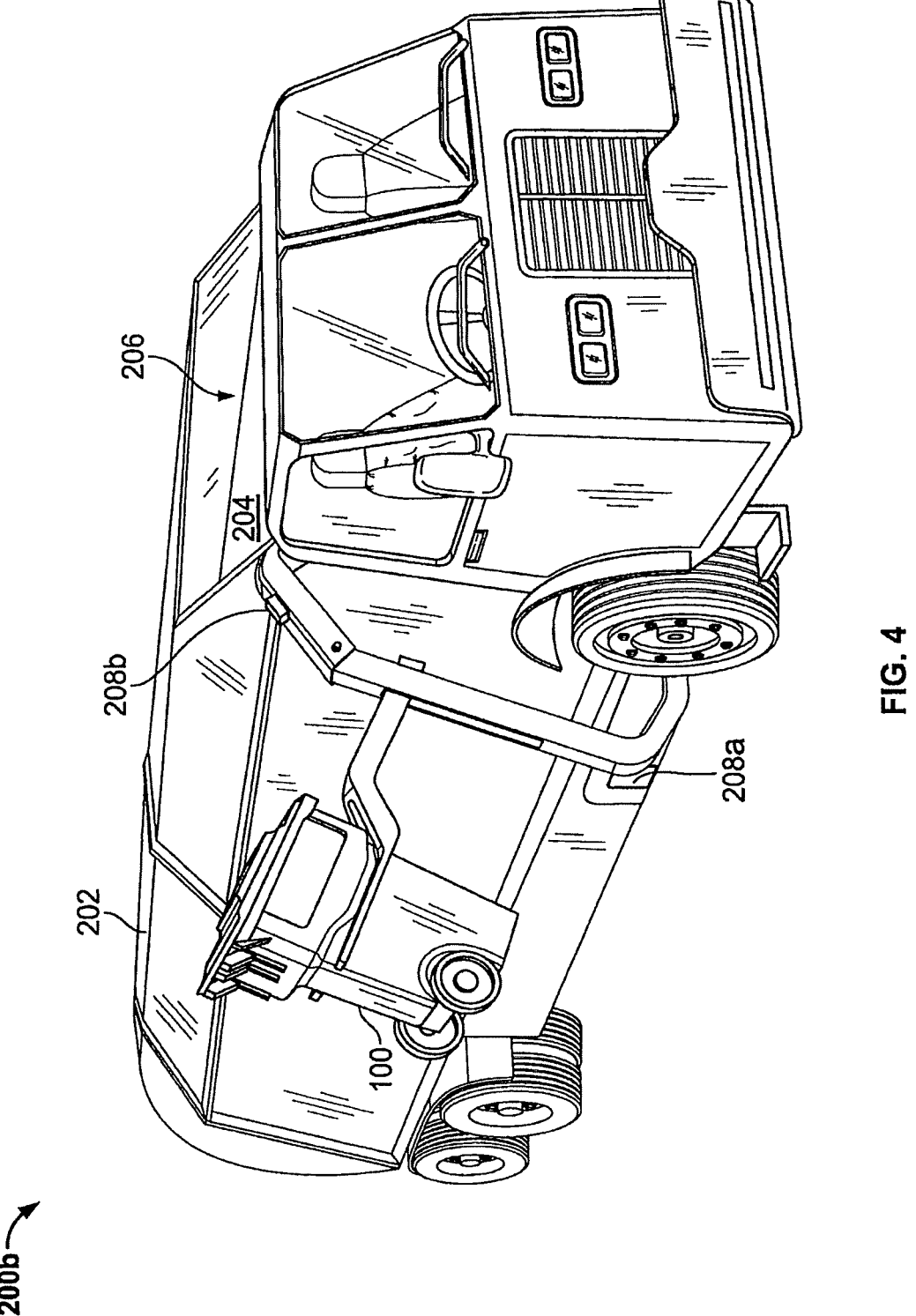
FIG. 4 is a perspective view of the vehicle of FIG. 3 with a waste receptacle in a second position.

The preferred location for the first receiver 208*a* on a side loading vehicle 200*b*, illustrated in FIGS. 3 and 4, is on a side of the vehicle corresponding to a side of the vehicle where the receptacle 100 would be located prior to or just as the means for transferring the receptacle 212 engages the receptacle 100. This location is typically on the passenger side adjacent the transfer means 212. This includes either just behind the cab or on the cab to the rear of the passenger side door. The first receiver 208*a* may be protected by locating on the passenger side and behind the cab, such that the receiver is protected by the cab and the waste bin 202.

Figure 5:
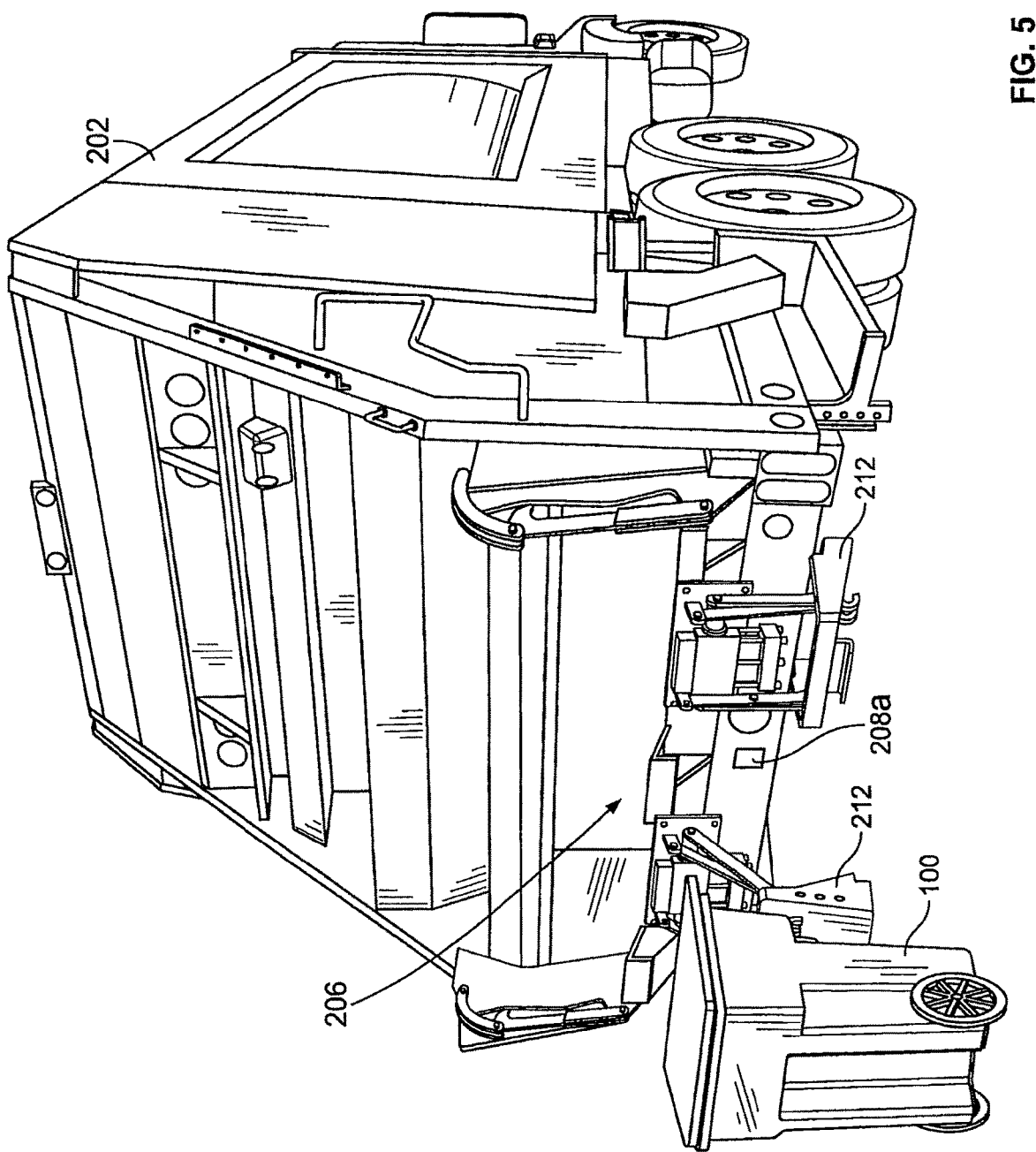
FIG. 5 is a perspective view of a third waste removal and hauling vehicle of the present invention.
Figure 6:
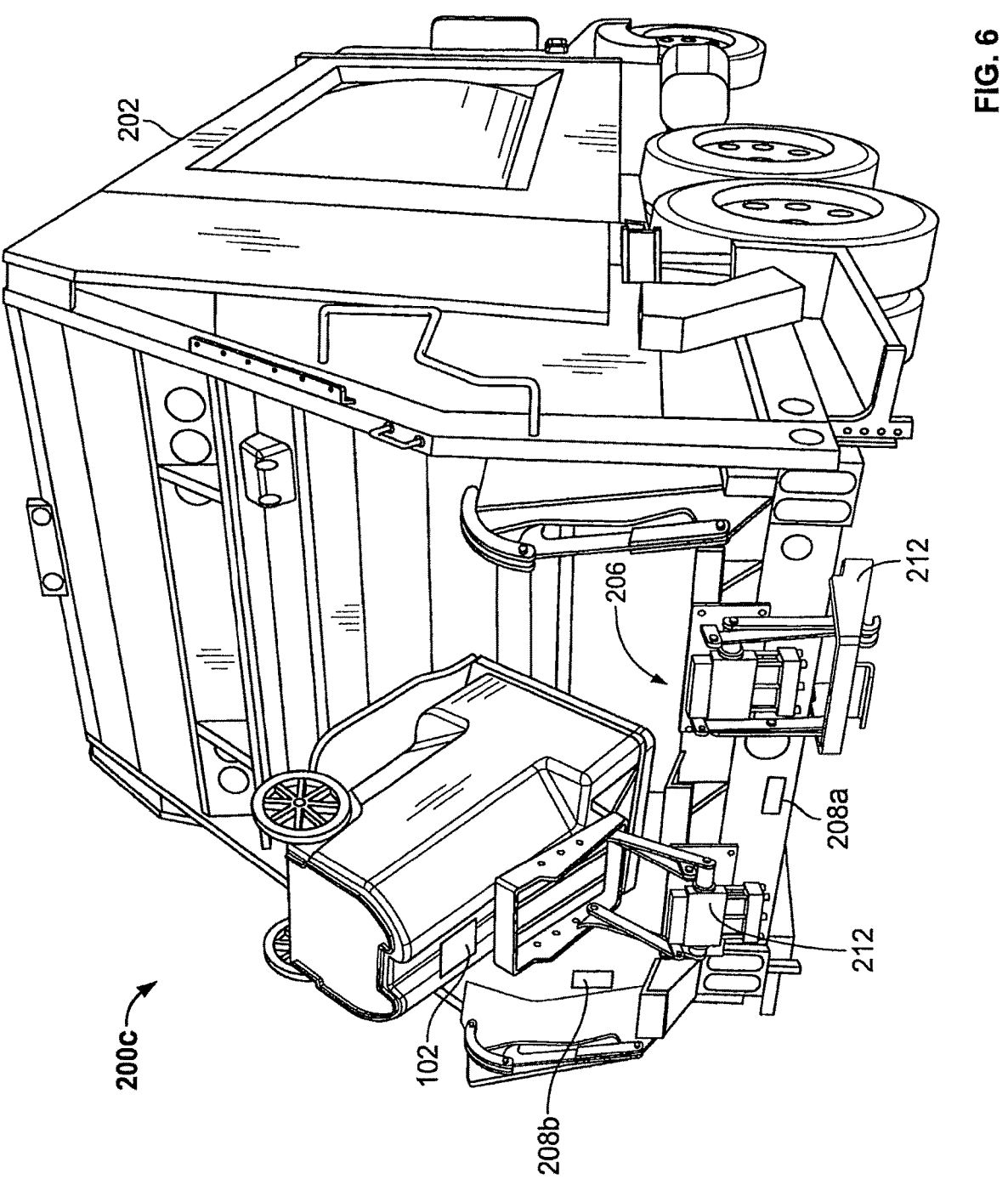
FIG. 6 is a perspective view of the vehicle of FIG. 5 with a waste receptacle in a second position.

The preferred location of the first receiver 208*a* on a rear loading vehicle 200*c*, illustrated in FIGS. 5 and 6, is at the rear of the vehicle 200*c* above the baseline, between the tail lights, but below the emptying site 206. Thus, as receptacles 100 are transported to the vehicle 200*c* for emptying at the emptying site 206, the communication means 102 may be positioned such that the first receiver 208*a* may receive the signal from the communication means 102 without difficulty. These types of vehicles 200*c* may or may not be outfitted with an automated means for transferring receptacle 212. The example shown in the drawings exhibits such an automated system.

Figure 7:
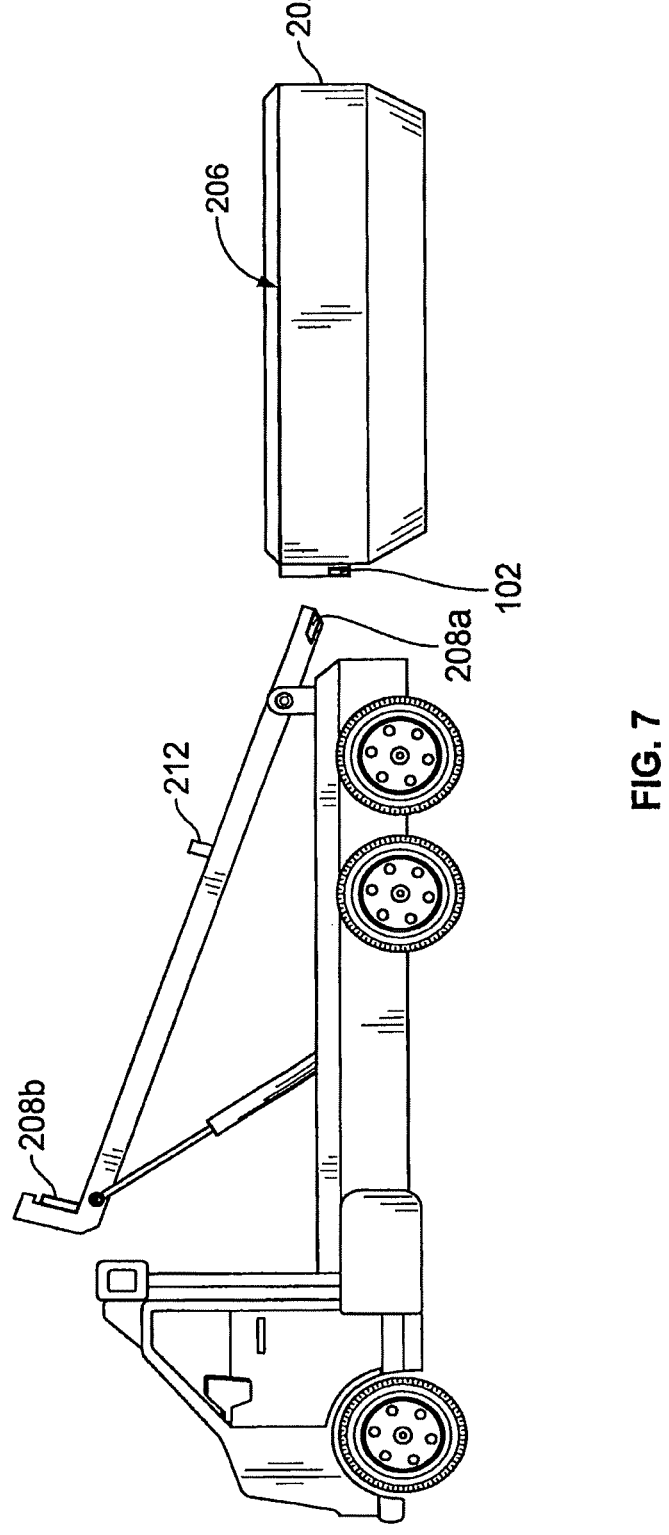
FIG. 7 is a perspective view of a fourth waste removal and hauling vehicle of the present invention.
Figure 8:
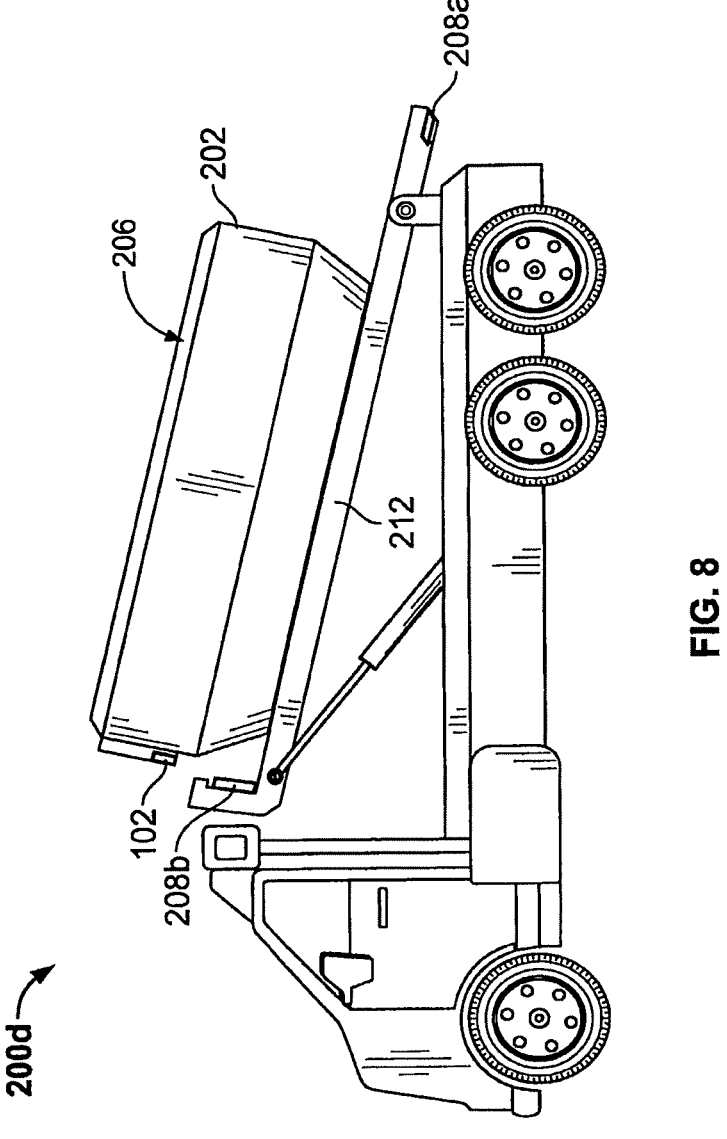
FIG. 8 is a perspective view of the vehicle of FIG. 7 with a waste receptacle in a second position.

The preferred location of the first receiver 208*a* on a roll-off vehicle 200*d*, illustrate in FIGS. 7 and 8, is similar to the location on rear loading vehicles 200*c*, namely at the rear of the vehicle 200*d*, above the baseline and between the tail lights of the vehicle 200*d* where the means for transferring 212 first engages the waste bin 202. Although one of ordinary skill in the art would readily recognize this point, it should be noted that a roll-off vehicle 200*d* differs from the other vehicles 200*a-c* in that the waste bin 202 also acts as the receptacle. Thus, the transfer means 212 does not transfer and dump a receptacle. Rather, it engages a waste bin 202 and loads it onto the vehicle 200*d* bed. It follows that the transmitter means 102 would be located on the waste bin 202, preferably on the forward or front facing wall as shown in the drawings.

The vehicles 200*a-d* also include a second receiver 208*b* located at a position where reception of the signal from the transmitter means 102 can be promoted either at the instant of receptacle unloading or just prior or just subsequent to receptacle unloading. Accordingly, this second location is typically adjacent the emptying site 206 to the chamber 204 and in alignment with the first receiver. The phrases "in alignment with the first receiver 208*a*," "aligned with the first receiver 208*a*," and the like are intended to include a position wherein a path of the receptacle and the means for transmitting 102 taken from the first position at the first receiver 208*a* to a second position at the second receiver 208*b*, as determined by the means for transferring the receptacle 212 included on the vehicles 200*a-c*, naturally brings the means for transmitting 102 to a location where the second receiver 208*b* can receive the signal from the means for transmitting 102, i.e. into a range of the second receiver 208*b* where reception is achieved.

The preferred location of the second receiver 208*b* on a front loading vehicle 200*a*, illustrated in FIGS. 1 and 2, is on the front of the vehicle 200*a* above the windshield and preferably above the cab, approximately aligned with the first receiver 208*a*. The second receiver 208*b* may be attached to the roof of the cab or closer to the emptying site 206, which is an opening on the vertically upper surface of the bin 202, on a portion of the bin 202 just behind the cab and aligned with the first receiver 208*a*. The second receiver 208*b* may be located within or protected by the shell of the vehicle 200*a* or the bin 202 as long as the receiver 208*b* is capable of achieving its purpose.

The preferred location for the second receiver 208*b* on a side loading vehicle 200*b*, illustrated in FIGS. 3 and 4, is on a side of the vehicle corresponding to a side of the vehicle where the receptacle 100 would be located and elevated above the position of the first receiver 208*a*. This location is typically on the passenger side either just behind the cab or on the cab to the rear of the passenger side door, either on the roof of the cab, on the rear of the cab adjacent the roof, or on some other portion of the vehicle 200*b*, such as an upper, stationary portion of the transfer means 212 as illustrated. In any case, the second receiver 208*b* is aligned with the first receiver 208*a* as determined by the path of the receptacle 100 provides by the means for transferring the receptacle 212.

The preferred location of the second receiver 208*b* on a rear loading vehicle 200*c*, illustrated in FIGS. 5 and 6, is at the rear of the vehicle 200*c* above the baseline, between the tail lights, and above the first receiver site 208*a* and aligned therewith.

The preferred location of the second receiver 208*b* on a roll-off vehicle 200*d*, illustrate in FIGS. 7 and 8, is generally some portion of the vehicle 200*d* adjacent to where the front face of the bin 202 having the transmitter means 102 is located once the bin 202 is loaded onto the vehicle 200*d*. This may be on the back of the cab adjacent to where the means for transmitting 102 on the waste bin 202 is positioned once the transfer means 212 positions the waste bin 202 on the vehicle 200*d*, or it may be on a forward portion of transfer means 212 as illustrated. Again, the second receiver 208*b* is preferably aligned with the first receiver 208*a*.

Figure 16:
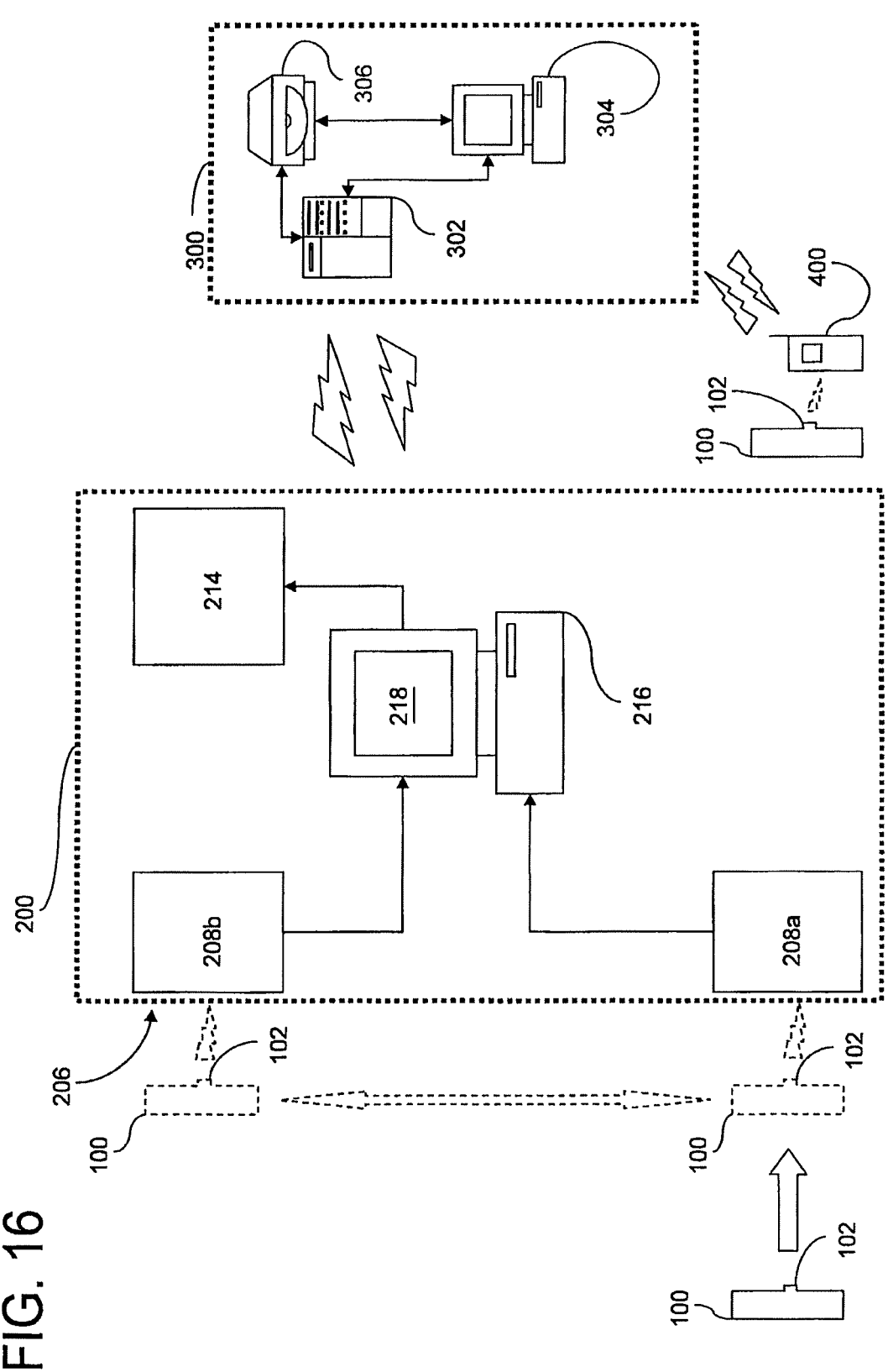
FIG. 16 is a block diagram illustrating an apparatus and a method of the present invention.

As shown in the block diagram of FIG. 16, the vehicle 200 has a controller 214, for activating and deactivating the means for transferring the receptacle 212, in communication with an on-board computer 216. The on-board computer 216 has a graphic interface 218 and provides the data or communication link to the external site 300 via modem or some other communication device. The controller 214 may also be a module within the on-board computer without departing from the spirit of the invention. Communication to and from the external site 300 is shown as wireless communication. The first and second receivers 208a,b are illustrated as spaced wherein as the transmitting means 102 traverses toward the first receiver 208a, the first receiver 208a receives the signal from the transmitter means 102. Likewise, as the receptacle 100 is transferred to the second position where the second receiver 208b is located, the second receiver 208b receives the signal from the transmitter means 102. Movement of the receptacle 100 and the associated signal are shown in dashed lines.

The external site 300 may include a server 302 in communication with computer 304 and a database 306, typically on the computer 304. Of course, the server 300 is not required to be at the same physical site as the computer 304, nor is it required for the database 306 to be stored on a computer separate from the server 302. The block diagram is merely an example of a possible layout. The only requirement for the external site 300 is the database 306 and a means for communication between the vehicles and database 306.

Now, as illustrated in flowcharts of FIG. 10-15, the various components of the system, the receptacle 100, the vehicle 200, and the external site 300, work together to provide an overall apparatus, the elements of which were described above, and a method for removing and hauling waste.

Figure 10:
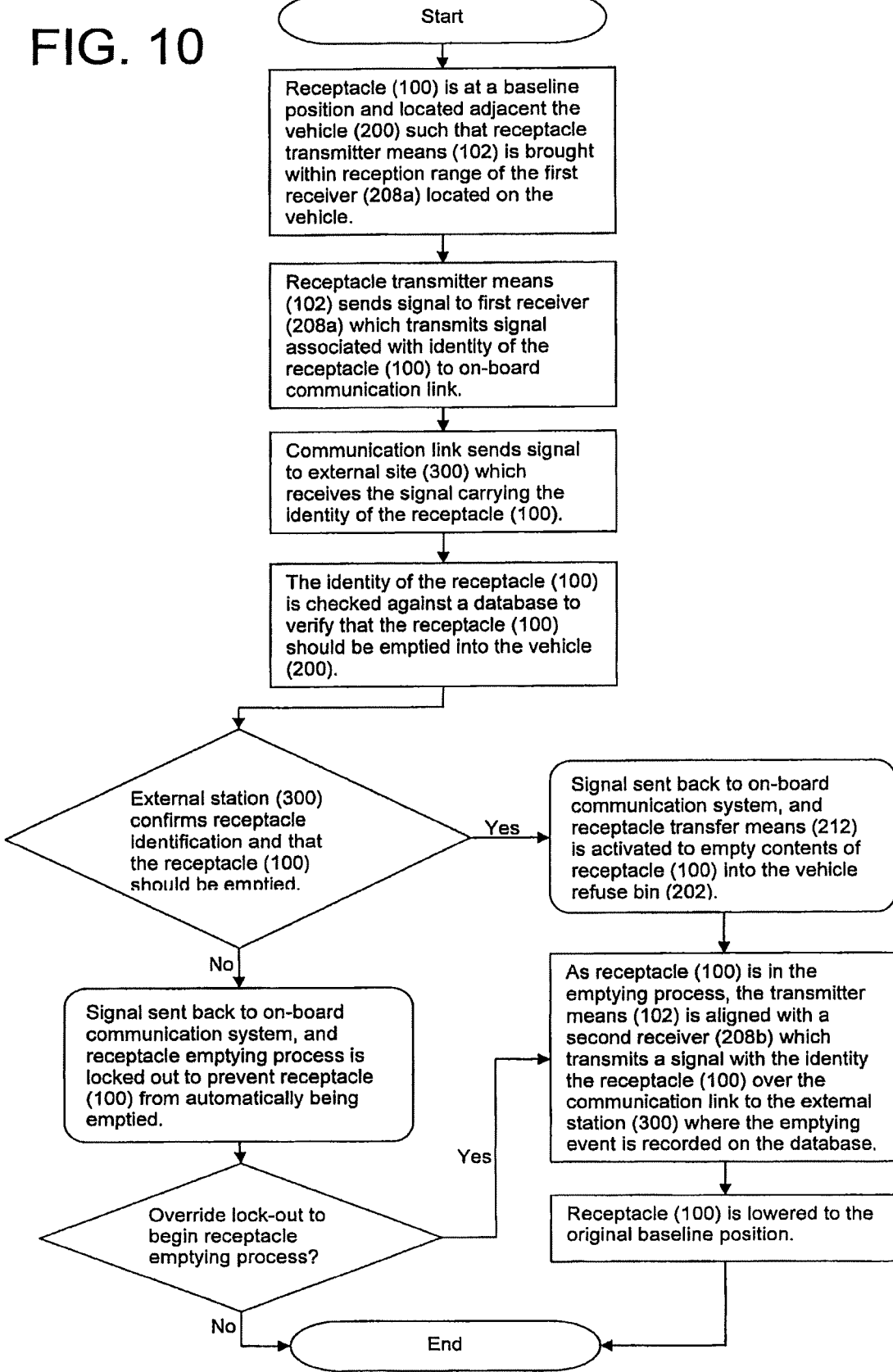
FIG. 10 is a flowchart of a method of the present invention.

Referring to FIG. 10, first, a receptacle 100 is located at a baseline position adjacent the vehicle 200 such that means for transmitting 102 is brought within the reception range with the first receiver 208a. The transmitter means 208a sends a signal carrying discreet receptacle identifier information to the receiver 208a. The receiver 208a either passes the signal directly to the on-board communication link, preferably a module of the on-board computer 216, or generates a new signal based on the signal received from the means for transmitting, but still including some type of receptacle identifier.

Next, the communication link sends a signal, either pass though or new, to the external site which receives the signal. The identity of the receptacle 100 is checked against an account database 306 to verify that the receptacle 100 should be emptied into the vehicle 200. A signal is generated indicating the account status associated with the receptacle identifier.

If the account is in good standing (pass condition), the controller 214 for the means for transferring the receptacle 212 is automatically activated either by a module or routine on the on-board computer or on the external computer 304. The means for transferring the receptacle 212 transports the receptacle 100 to the emptying site 20 where the transmitter means 102 is within reception range of the second receiver 208b. The transmitter means 102 sends a signal carrying discreet receptacle identifier information to the receiver 208b. The receiver 208b either passes the signal directly to the on-board communication link, preferably a module of the on-board computer 216, or generates a new signal based on the signal received from the means for transmitting, but still including some type of receptacle identifier. The triggered or pass through signal from the second receiver 208b represents an event. The event is preferably the emptying of the receptacle 100 into the vehicle bin 202. This event is recorded on the database 306 at the external site 300 and associated with the receptacle account.

If the account is not in good standing (fail condition), the controller 214 is not activated, a signal carrying an alarm or warning is transmitted to the vehicle 200. The account status can also be displayed on the on-board graphic interface 218. As a result, the transfer means 212 is not activated, and the receptacle 100 is not emptied into the vehicle bin 202. However, if for some reason, such as immediate, on-the-spot payment of an invoice by a customer, the vehicle personnel are inclined to empty the receptacle 100, vehicle personnel may override the alert and manually engage/energize the transfer means 212. In this case, as illustrated on the right hand side of FIG. 10, transmitter means 102 sends a signal carrying discreet receptacle identifier information to the second receiver 208b. The second receiver 208b either passes the signal directly to the on-board communication link, preferably a module of the on-board computer 216, or generates a new signal based on the signal received from the means for transmitting, but still including some type of receptacle identifier. The triggered or pass through signal from the second receiver 208b represents an event. The event is preferably the emptying of the receptacle 100 into the vehicle bin 202. This event is recorded on the database 306 at the external site 300 and associated with the receptacle account. The first receiver 208a may send an additional signal at a second moment in time when the receptacle 100 at is returned to the first position.

Figure 11:
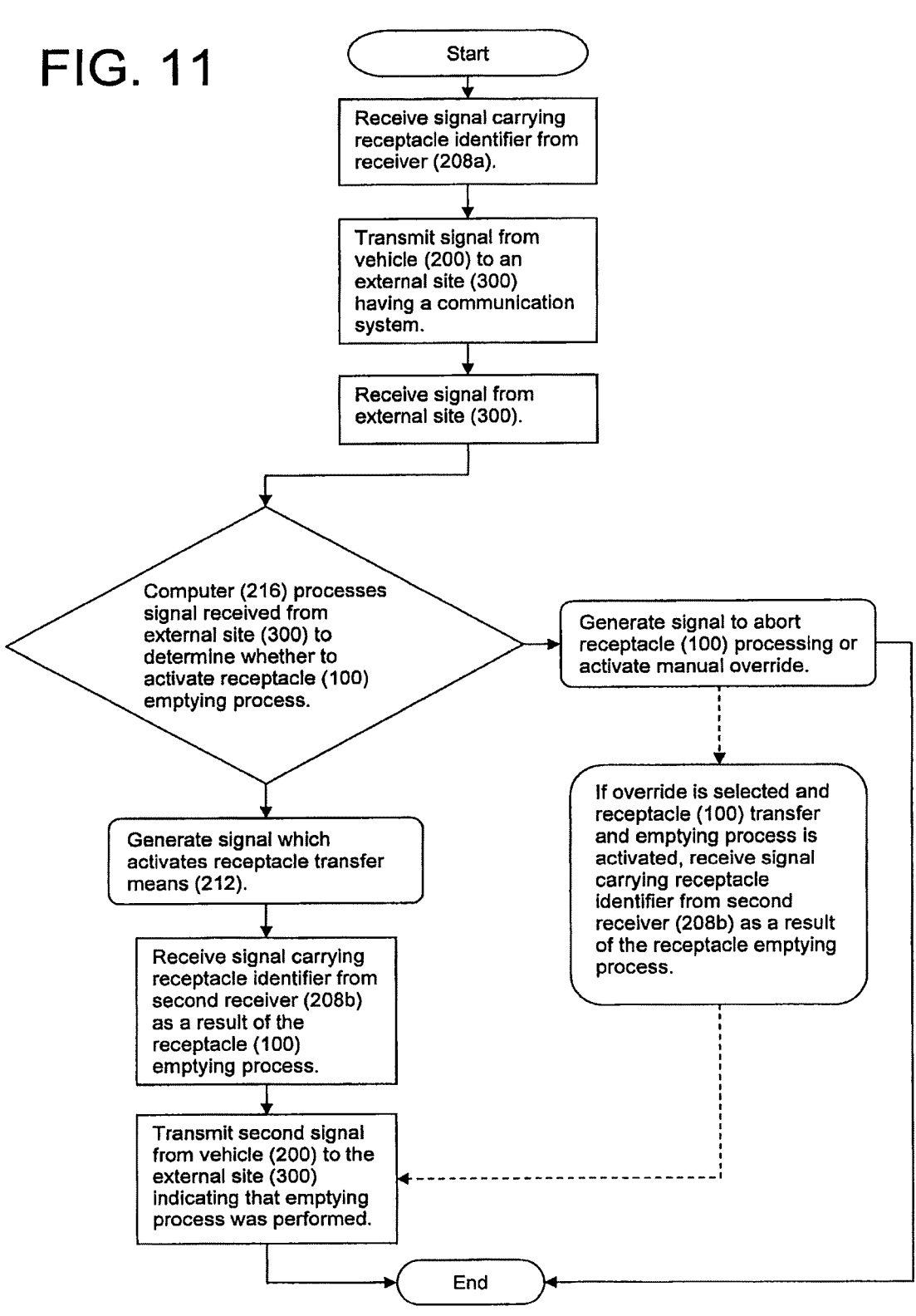
FIG. 11 is a flowchart of a process of an on-board computer.

Referring specifically to FIG. 11, a flowchart of a process of the on-board computer 216 is illustrated. Here, the communication or data link between the receivers 208a,b and the external site 300 is a module or routine provided by the computer 216. This process comprises receiving a signal carrying the receptacle identifier from the first receiver 208a. The computer 216 then transmits a signal from the vehicle 200 to the external site 300. Once the data has been analyzed at the external site 300, the computer 216 receives a return signal from the external site 300 and determines whether to activate the transfer means 212 or require an override to empty the receptacle 100. If the transfer means 212 is activated, either automatically or manually via override, the second receiver 208b will send a signal to the computer 216. The computer 216 transmits a second signal to the external site 300 indicating that the emptying event has taken place.

Figure 12:
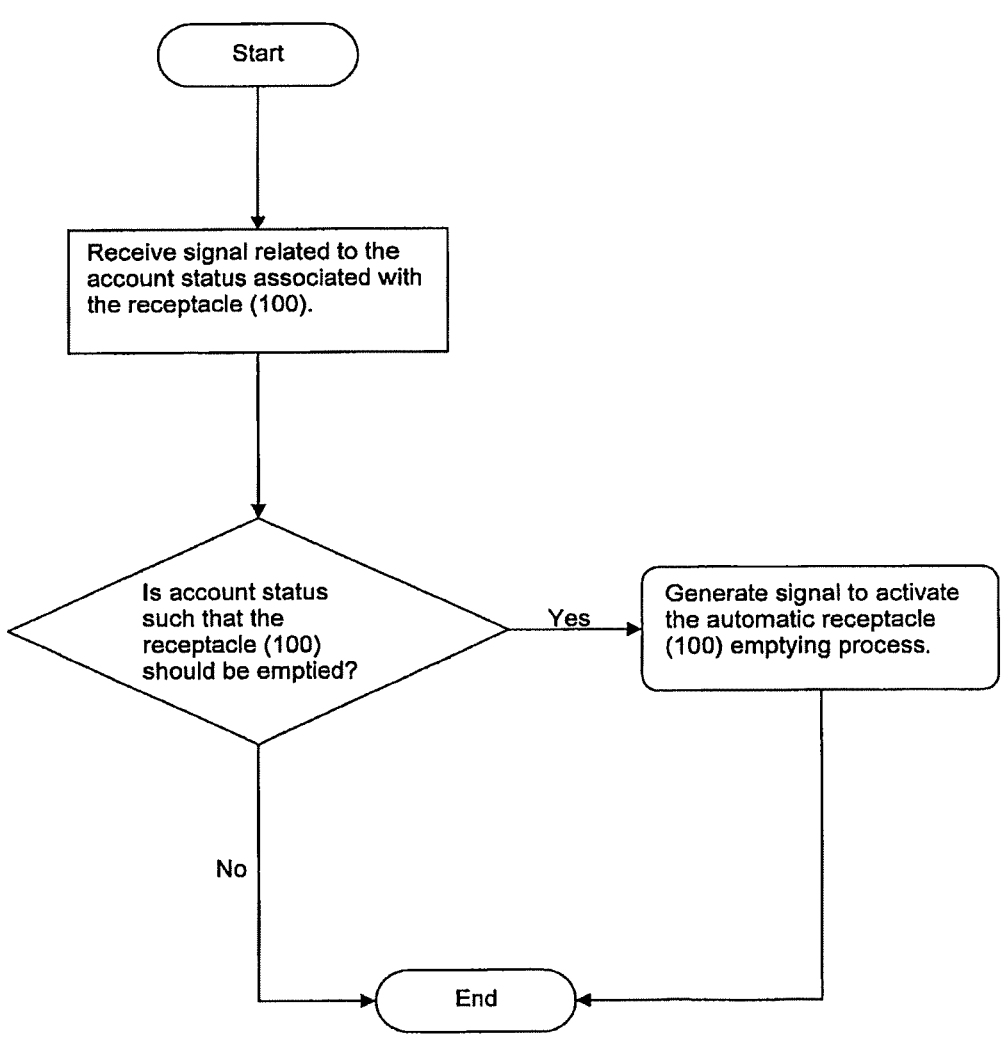
FIG. 12 is a flowchart of a process for controlling automatic receptacle emptying carried out by an on-board computer.

Referring specifically to FIG. 12, a process for controlling the transfer means 212 is illustrated. This process may be performed by the on-board computer 216 or by an existing controller 214 in communication with the on-board computer 216. The computer 216 receives a signal related to or determined by an account status associated with the receptacle. If the account status is such that the receptacle should be emptied, i.e., current, a signal is generated to automatically energize the transfer means 212. If the account status is not current, the process ends.

Figure 15:
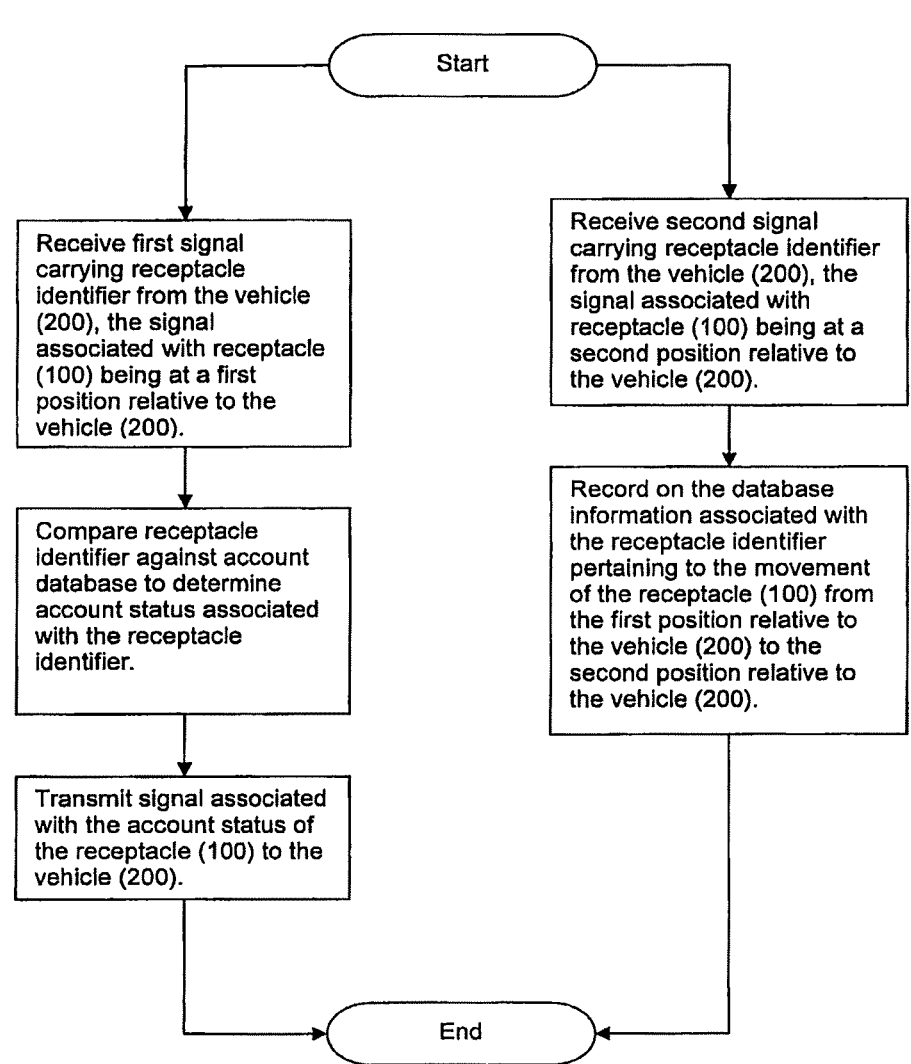
FIG. 15 is a flowchart of a communication process carried out by an on-board computer.

Referring to FIG. 15, a process of the computer 304 of the external site 300 is illustrated. The main purpose of the server 302 and/or the computer 304 of the external site 300 is to hold or have the capability of accessing a database 306, the database 306 including an association between receptacle identity, ownership or responsibility, and account status. In terms of the overall system or method of the invention, the external site 300 communicates with the vehicle 200 by receiving and sending signals.

For example, the external site 300 receives a first signal carrying a receptacle identifier from the vehicle 200. This first signal is associated with the receptacle 100 being located at the first position. The first signal originates with, though is not necessarily identical to, the signal received from the transmitter means 102 at the first receiver 208*a*. A module at the external site 300, preferably on the computer 304, compares the data carried by the signal against account information on the database 306 to determine an account status associated with the receptacle identifier. The result of the comparison, i.e., the account status, is transmitted from the external site 300 back to the vehicle.

Further, the external site 300 receives a second signal from the vehicle 200. This second signal is associated with the receptacle 100 being located at the second position. The second signal originates with, though is not necessarily identical to, the signal received from the transmitter means 102 at second receiver 208*b*. A module at the external site 300, preferably on the computer 304, compares the data carried by the signal against account information on the database 306 and records an event, the emptying of the receptacle 100, in connection with the receptacle 100.

Figure 18:
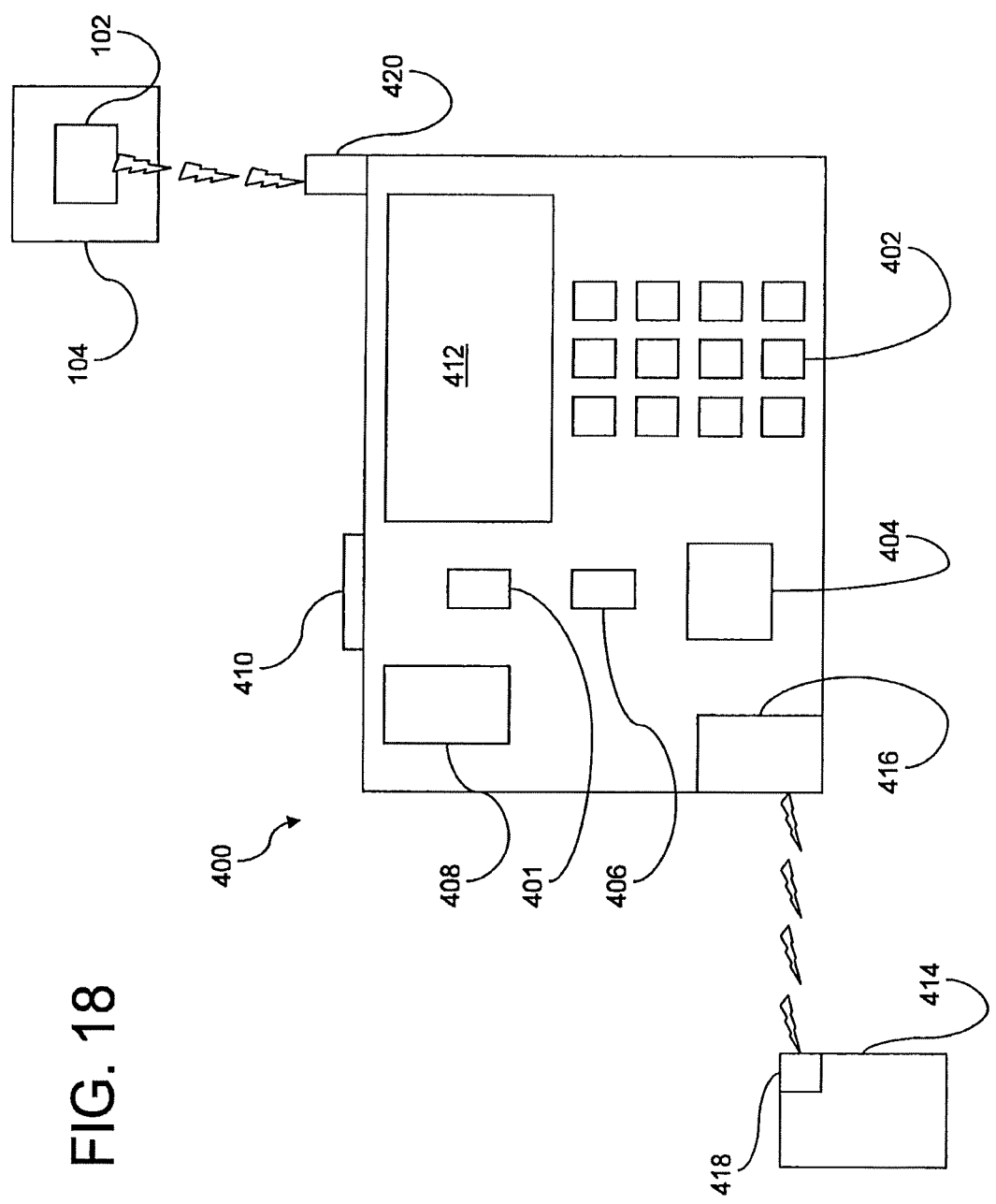
FIG. 18 is a block diagram of an aspect of the invention for use in conjunction with the method FIG. 17.
Figure 19:
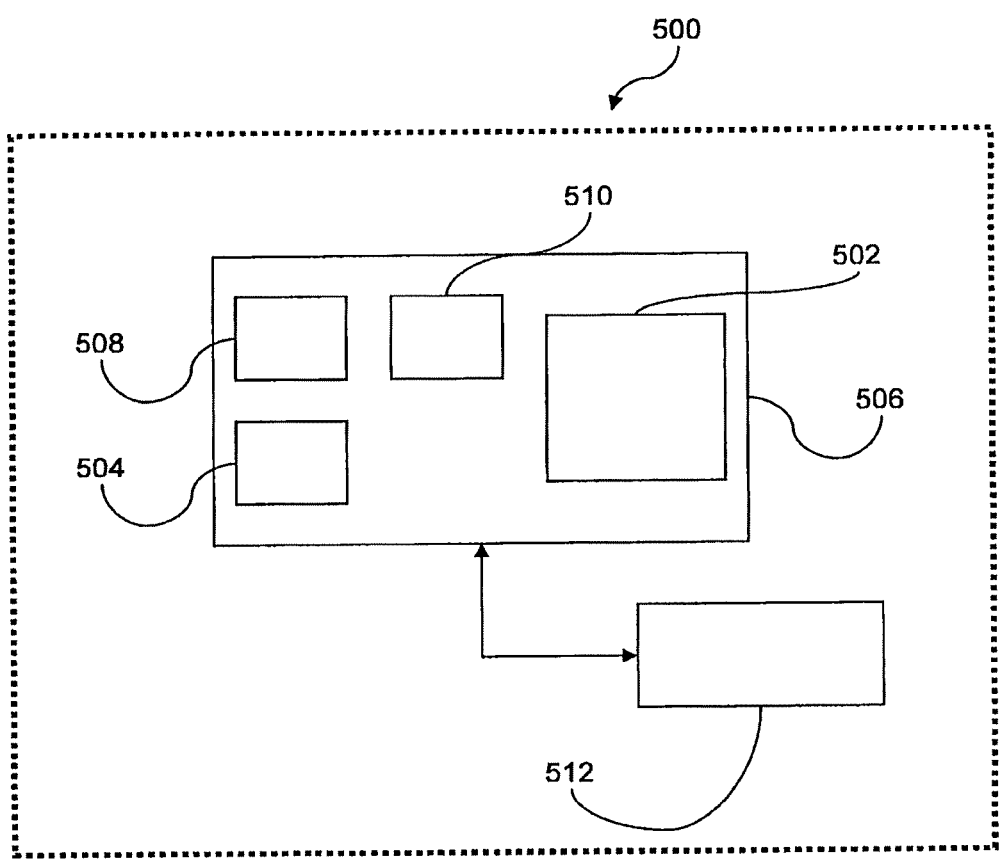
FIG. 19 is a block diagram of an aspect of the invention for use with the method of FIG. 17.

Referring generally to FIGS. 17-19, the inventors also foresee the means for communicating or transmitting 102 as being supplied by municipalities on a permit basis to citizens. This would provide several advantages. First, the permit process would provide an unexpected source of income to the municipality because the typical permit granting process comes with an associated government fee. Secondly, it would provide a means by which the municipality can easily track ownership of or responsibility for the receptacle. Thirdly, because ownership of the receptacle would be stored on the database created during the permit process, citations for misuse, neglect, damage, etc. can be easily, swiftly, and electronically generated using a handheld receiver with printer for generating citations, providing yet a further stream of income to municipalities as well as improving lane conditions, thus reducing the likelihood of infestation by vermin. In addition, sanitation inspectors would be more productive due to the automation provided by the handhelds readers in combination with the communication means, preferably RFID tags 102.

As set forth above, this aspect of the invention directly results in cleaner streets and alleys. The invention will eliminate or reduce trash overages, under size containers, poor container maintenance condition, e.g., no lid. Permits and citations will force compliance. Users can specify correct container size, schedule additional pick-ups. Service may be halted due to lack of payment or by schedule.

Information regarding each permit/receptacle identifier, the account associated therewith, and the entity responsible for the account/permit/receptacle is stored on a managed database. The database may include other information such as hauler name, permit number and container asset number (human readable sticker and RFID tag). Use and access of the database is explained in more detail below.

The RFID tags 102 can be read by inspectors having mobile and/or handheld computers 400. Citations may be issued immediately via printer on the handheld 400 and/or mailed with back-up violation data. Inspectors and other municipal employees use mobile handheld RFID readers with cameras to read tags and report violations. Citations can be issued and wireless transmission of data achieved through the handhelds 400.

This aspect of the invention requires haulers or receptacle owners to purchase annual container permits. The issued permit includes a means for transmitting 102, such as an RFID container tag. Revenue to the municipality is generated by an enforcement program.

Further, a container registration fee includes RFID tagging. The RFID tag information is linked to customer and hauler information in the database.

More specifically, a tag 102 (such as a passive RFID tag) acts as a permit. While the description below discusses passive RFID tags as permits, it is recognized that other information storing devices can also be used, such as active RFID tags, hybrid RFID tags, smartcards, and other hereto unknown items.

Typically, one goes to the governing body or agency and fills out the necessary registration forms, pays the necessary fees, and receives the RFID tag 102 acting as a permit. This initial registration and payment can also be done on-line through the internet or over the telephone. The tag includes certain necessary information dependent on its purpose. Encoding, entering, and keeping such information on the tag is well-known to those skilled in the art. Such information can include: the permit's issuing body (e.g., Secretary of State, Village of Anywhere, City of Nowhere), the date of issuance of the permit, the term of the permit (e.g., Jun. 1, 2010-May 31, 2011), the type of permit (e.g., "Permit for Trash," "Vehicle Permit," Elevator Permit), the location for the permit's use (e.g., "123 Main St. Anytown, USA," "1999 Ford Austere," "Elevator No. 6 SE for The Towers"), the responsible party's name and contact information (e.g., "Joe Smith at 111 S. Main, Anytown," "Office of Management, The Towers, 432 E. Main, Anytown," "Joe's Construction Co., 999 W. Main, Anytown"), and any other information necessary under the circumstances for the inspector to make a determination as to whether the permit is in compliance or out of compliance resulting in a violation. In the preferred application, the tag 102 includes all the information necessary for a government or independent inspector to make a determination in the field at a remote location as to whether a violation is present and has occurred relating to the item being inspected.

For visual inspection and to ensure proper location (e.g., the tag is in the correct vehicle or at the correct address), the RFID tag 102 typically has identifying indicia thereon such as time period involved, address, municipality's identity, and possibly the owner's identity. This ensures the tag 102 is placed at the proper location and gives the inspector visual verification of the tag's location.

The tag 102 is given or sent to the person responsible for the permit along with specific instructions as to placement, use, and purpose.

The 102 tag can also include a mounting component 104, such as a protective pocket or pouch having an adhesive on one side so the pouch can hold the tag and protect it and be adhered to the location where the permit is to be displayed, e.g., the outside wall of a recycling container, the inside of a trash can lid (outside the trash can itself) or on the outside can wall, the inside of a windshield, the inside of a business window, etc.

Examples:

| Permit Purpose | Permit | Identification Information | Carrier | Location |
|---|---|---|---|---|
| Trash/ Refuse Removal | The Collection, Storage of Trash/Refuse for Removal and Size of Container, Compactor or Bailer | Address Type of Container Permit Number & Date Term/Period Valid | Protective Pocket with adhesive on one side | Placed on inside of lid for Trash Container or outside Large Compactor/ Bailer |

-continued

| Permit Purpose | Permit | Identification Information | Carrier | Location |
|---|---|---|---|---|
| Recyclables Removal | Collection of The Collection, Storage and Removal of Recyclable Materials and Size of Container, Compactor or Bailer | Address Type of Container Permit Number & Date Term/Period Valid | Protective Pocket with adhesive on one side | Placed on inside of Lid for Recyclable Container or outside Large Compactor/ Bailer |
| Grease Boxes | The Collection and Storage of Discarded Grease for Removal | Address Type of Container Permit Number & Date Term/Period Valid | Protective Pocket with adhesive on one side | Placed on inside of Lid for Recyclable Container or outside of Box |
| Business | To Conduct Business at a Certain Premise | Address City Name Permit Number & Date Term/Period Valid | Protective Pocket with adhesive on one side | Placed on inside of Window for Business |
| Vehicle | To Park a Vehicle Residing within Municipality's Borders | Type of Vehicle City Name Permit Number & Date Term/Period Valid | Protective Pocket with adhesive on one side | Placed on inside of Window for Vehicle |
| Fuel Dispensing | To Dispense Accurate (Inspected) Amounts of Fuel within Municipality's Borders | Address City Name Permit Number & Date Term/Period Valid Issuing Body and Contact Info. | None | Placed on Dispensing Mechanism |
| Elevator | To Safely Operate (Inspected) Elevator within Municipality's Borders | Address City Name Permit Number & Date Term/Period Valid Issuing Body and Contact Info. | Frame | Placed in Frame on Elevator Wall |
| Construction | To Perform Construction (New, Addition, Improvement) within Municipality's Borders | Address City Name Owner Contractor Permit Number & Date Term/Period Valid Issuing Body and Contact Info. | Protective Pocket with adhesive on one side | Placed at Construction Site (In Window or on Sign Advising of Construction) |
| Billboard | To Display Public Advertisement | Location City Name Owner Permit Number & Date Term/Period Valid Issuing Body and Contact Info. | Protective Pocket with adhesive on one side | Place at Bottom or on Back of Billboard Stand |

-continued

| Permit Purpose | Permit | Identification Information | Carrier | Location |
|---|---|---|---|---|
| Portable Toilets | To Safely Operate a Healthy Facility within Municipality's Borders | Location City Name Service Provider- Owner User/ Customer Permit Number & Date Term/Period Valid Issuing Body and Contact Info. | Protective Pocket with adhesive on one side | Placed inside Unit |
| Newspaper Stands | To Conduct Business at a Certain Location | Address City Name Permit Number & Date Term/Period Valid | Protective Pocket with adhesive on one side | Placed on Conspicuous Location on Stand |

The handheld device 400 is preferably a small computer carried by an authorized remote user. It is the method used to gather information in the field by the inspector, such as a policeman, village employee, etc. The device 400 includes several components, that being a power source 401, such as a battery, a means to enter data (a reader and keyboard) 402, an internal clock 404, a memory 406, a GPS locator 408, a camera 410, a monitor or screen 412, and a printer 414 or preferably a wireless connection 416 to a printer 414 having a wireless communication means 418.

One or more methods can be employed to enter the necessary data into the remote handheld device 400. The preferred means is an RFID reader 420. The reader 420 is capable of reading passive RFID tags 102 in the field. A keyboard 412 may also be provided for entering additional data as may be necessary.

In particular, three items are inputted into the remote handheld device 400, that being an authorization code, the permit information, and the time and date. The user's authorization code and the date and time can be entered on a keyboard provided on the handheld device 400. However, the preferred method of entering such data is by a reader 420 associated with the handheld device 400. The reader 420 can read the tags 102, such as passive RFID tags. The user/ inspector can thus have an identification RFID card with the necessary authorization codes thereon to activate the device 400 and to operate and use the device 400 once the reader 420 reads the authorization information. Similarly, the reader 420 can read the information provided on the permit, such as a license plate number, a home address, a business address, etc. The date and time can be entered automatically by an internal clock 404 in the device 400.

A internal clock 404 is provided to document the time certain events occur, such as the reading, gathering and/or entering of information associated with reading the permit, the date/time of a photograph, and the date/time a citation is entered or printed, etc. The clock 404 is an internal mechanism stamping the memory of the event (permit reading, photograph, GPS locating, citation issuance) with the date and time of the event.

The device 400 includes a screen or monitor 412 for displaying information read and received. The device 40 also includes a wireless connection or link (Bluetooth) 416 to a mobile printer 414. The device 400 can then display or print information obtained by the reader 420 in the device 400 relating to the tag 102 or generated by the device 400 and relating to a citation. In the alternative, the printer 414 need not be mobile, but can be used at a central location 500 so that when the device 400 is downloaded at a central location 500 (such as the police station or city hall) through conventional means, information read by it or citations generated by it can be printed out.

An optional camera 410 and/or GPS locator 408 may also be provided in the handheld device 400 to document both what is seen visually by the remote user and to identify the location of the remote user.

Once the data has been entered or citation processed, the entry or issuance can be confirmed by digital or physical signature. The device 400 can have a touch screen for recording a signature by the inspector. In the alternative, the inspector's authorization card can be read once more or drawn from the device's memory 406 to confirm the inspector's identity and authorization relating to the entry of information or issuance of a citation.

As noted, biographically and permit information is obtained from an applicant for the permit and stored in the tag 102. For trash, refuse and recyclables this information will also include time period of permit (e.g., 6 months, 1 year, etc.), number of containers, location of containers (address), type of containers (e.g., size), and hauler information (identity, contact information, pick-up schedule, etc.). A permit, in this case—an RFID tag 102—is issued by the authorized body. The RFID tag 102 will typically have identifying indicia thereon such as address of containers, and possibly types and/or size of containers. The RFID tag 102 has an adhesive thereon or is placed into a protective pouch (having a transparent cover, with an adhesive on an outwardly facing surface). The RFID tag 102 is then adhered to the outer container wall in a designated location.

A remote, authorized user, typically a government or third party inspector enters an authorization code by typing it in or reading it (or it is automatically drawn from memory 406 and the initial sign-on/authorization), on her handheld device 400. When at the remote location, the inspector then reads the RFID tag 102 (the permit information contained thereon) with the handheld device 400. The display 412 (or print-out) will then display the necessary information for the inspector to make a determination as to whether the permit is in compliance or whether there is a violation. Such violations can include, among others, the permit is outdated and expired, the containers 100 of the permit are not the same as those being used, the containers 100 are constantly and consistently overflowed meaning they are undersized, the containers 100 are damaged and have not been properly maintained, the containers 100 are missing lids/covers, the containers 100 are in an improper location, the containers 100 do not have a permit, and/or the hauler has not made the necessary and scheduled pick-ups of recyclables and/or refuse. Of course, one of the primary purposes of issuing citations is to force compliance with rules, regulations and ordinances to maintain properly sized, safe equipment.

If desired, to document or corroborate the violation, the inspector can take a photograph of the scene with a camera 410 built-into or associated with the handheld device 400 and obtain the GPS location of the scene with a GPS locate 408 built-into or associated with the handheld device 400. This documentation stored in memory 406 can accompany the citation or merely be kept in memory 406 (on the handheld device or at a central database 502 at the central station 500) as back-up. It is preferred to have such documentation accompany and be part of the citation.

Once a violation has been determined, the inspector can issue or process a citation. This can be accomplished many ways. One way is to use the information read from the tag 102 and in the memory 406 of the handheld device 400 and entering the necessary information associated with the violation. The citation can then be stored in the memory 406 of the device 400 and formally issued later via mail or similar once the inspector's tour is completed. In the alternative, the device 400 can include a wireless link 416 to a mobile printer 414 for printing the citation and giving it or leaving it with the responsible party (business owner, individual, etc.). The violation and citation records can further be stored in the device's memory 406 for downloading later for documenting the citation, record keeping, tracking and follow-up. If the device 400 was used to take a picture and/or obtain location information, that information can also be attached or used with the issued citation as confirmatory information and supporting documentation.

It should be recognized that while the handheld device 400 is discussed as being carried by an inspector, it can also be mounted on a vehicle. As a result, the tag-permit can also be read by an RFID or similar reader mounted to a mobile vehicle. In some instances, this may prove to be more efficient.

The above describes a system wherein the tag-permit 102 and handheld device 400 are the primary components and virtually the sole components of the system. In an alternative device, the device 400 includes a communications module 416 to communicate with a central station 500 having a central database 502 and the tag-permit 102 has encoded information thereon for directing the central station 500 to make a determination of whether there is a violation and a citation should be issued.

Briefly, while the tag 102 acts as the permit, it merely includes identifying information encoded therein. As before, it may also have identifying indicia thereon such as time period involved, address and municipality's identity and possibly the owner's identity. Again, a mounting component 104, such as a pouch, can be used also.

The registration information, instead of being stored on the permit, is stored in a memory 504 associated with the central station 500. The central database 502 is housed and maintained at the central location 500 such as a police station, village hall, county office or state agency, or third party service provider. Some, if not all of the information is obtainable by and from an authorized remote user. The central database 502 is maintained on a system, such as on a computer 506, that can receive queries and transmit select information automatically or by pointed requests. As a result and by way of example, a policeman may access the database 502 and request certain vehicle and owner information by entering a license plate number or by specific inquiry prompted by reading the RFID-permit.

A communication module 508 is associated with the central station 500 allowing data or information to be received from one or more remote handheld devices 400 and information to be transmitted to one or more remote handheld devices 400.

Housed with the central station 500 is look-up and/or comparison software 510 capable of receiving information from the handheld device 400, polling/querying the memory 504 associated with the central station 500, and if necessary, making a comparison and generating a report or result of the comparison made. The information polled/looked up or generated by a comparison is then sent to the remote handheld device 400.

Specifically, the information obtained from the handheld device 400, such as a license plate entered into the remote handheld device 400 or by reading the tag 102 with an RFID reader 420, and received by the central station 500 will be looked-up or compared with the information accessed from the central database 502. The individual operating the remote device 400 can then determine whether a violation has occurred (such as when the looked-up data shows the permit has expired). Or, the database 502 comparison will then determine if the information obtained is the same as the information stored and/or determine whether a violation has occurred, such as the permit period paid for has lapsed.

The handheld device 400 is described above and is similar, except it further includes a communications module 416 for transmitting and receiving communications from the central station 500.

As noted, biographically and permit information is obtained from an applicant and stored in memory in a central database 502. A remote, authorized user, typically a policeman, government employee, or third party or government inspector, once authorized, reads the RFID-permit by the handheld device 400. This information is transmitted to the central database 502 where, in turn, the database queries its memory for information necessary to determine if a violation occurred, such as the permits expiration or improper container size. A citation can then be issued. And printed a the handheld devise 400 or on a printer 512 at the central station 500

By way of example, with respect to vehicle stickers, a traffic control manager can read an RFID attached to a windshield and transmit the information to a central database 502. The central database 502 then polls its memory 506 for information associated with that permit. The database or the manager in the field can then determine if the permit is expired or if the permit is associated with the correct vehicle. If a violation has occurred, the manager can issue a citation by printing a citation and attaching it to the car or transmitting the necessary information to the central database for printing and issuing (by mail) the citation.

While the specific embodiments have been illustrated and described, numerous modifications come to mind without significantly departing from the spirit of the invention, and the scope of protection is only limited by the scope of the accompanying Claims.

What is claimed is:

1. A method for managing pickup of receptacles, the method comprising:
   providing a tag in the form of a passive radio frequency identification tag, the tag having a unique identifier associated with the tag, wherein the tag is affixed to a receptacle;
   providing a database external to the tag and comprising a plurality of unique identifiers and biographical information associated with a plurality of users;
   reading the unique identifier from the tag at a pickup location of the receptacle;
   sending the unique identifier associated with the tag to the database;
   correlating, using the database, the unique identifier associated with the tag with the biographical information associated with at least one user of the plurality of users to provide identification information;
   providing service status information, including an account status for the receptacle based upon identification information provided from the database; and
   in response to the status information indicating that the account status is not current, automatically precluding pickup of the receptacle by changing the capability of pickup equipment on a vehicle to prevent transfer of the receptacle from a first position at which the pickup equipment is temporarily retaining the receptacle to a second position at which the pickup equipment empties the receptacle, and
   in response to the status information indicating that the account status is current, automatically allowing pickup of the receptacle by changing the capability of the pickup equipment on the vehicle to cause the pickup equipment to transfer the receptacle from the first position to the second position.

2. The method of claim 1, wherein the identification information is one or more of the comprising address, type of receptacle, permit type, validity dates, term, or refuse type.

3. The method of claim 1, wherein changing the capability of the pickup equipment on the vehicle to prevent transfer of the receptacle from the first position to the second position comprises deactivating the pickup equipment, and wherein changing the capability of the pickup equipment on the vehicle to cause the pickup equipment to transfer the receptacle from the first position to the second position comprises activating the pickup equipment.

\* \* \* \* \*